(12) United States Patent
Hayashi et al.

(10) Patent No.: US 8,104,373 B2
(45) Date of Patent: Jan. 31, 2012

(54) CABLE-TYPE DRIVING FORCE TRANSMISSION MECHANISM

(75) Inventors: Yasuhito Hayashi, Nagoya (JP); Keiichi Shino, Toyota (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 544 days.

(21) Appl. No.: 12/364,696

(22) Filed: Feb. 3, 2009

(65) Prior Publication Data

US 2009/0193922 A1 Aug. 6, 2009

(30) Foreign Application Priority Data

Feb. 5, 2008 (JP) ................................. 2008-025070
Sep. 12, 2008 (JP) ................................. 2008-235574

(51) Int. Cl.
*F16C 1/22* (2006.01)
*F16D 66/00* (2006.01)

(52) U.S. Cl. .................................. 74/502.6; 188/1.11 E

(58) Field of Classification Search ............... 74/473.15, 74/502.4, 502.6, 522–527, 519, 473.3; 73/121, 73/826, 774, 779, 862.473, 862.626; 188/2 D, 188/1.11 R, 1.11 E, 72.1, 72.7, 72.8, 156, 188/162

See application file for complete search history.

(56) References Cited

U.S. PATENT DOCUMENTS

| | | | | |
|---|---|---|---|---|
| 6,752,249 | B1 * | 6/2004 | Jungbecker et al. | 188/162 |
| 6,959,794 | B2 * | 11/2005 | Ralea et al. | 188/156 |
| 7,314,123 | B2 * | 1/2008 | Sakashita et al. | 188/204 R |
| 7,441,632 | B2 * | 10/2008 | Tachiiri et al. | 188/1.11 E |
| 7,484,432 | B2 * | 2/2009 | Yamanaka | 74/502.6 |
| 7,730,805 | B2 * | 6/2010 | Nichols | 74/502.6 |
| 7,891,468 | B2 * | 2/2011 | Tsubouchi | 188/1.11 E |
| 2006/0001316 | A1 | 1/2006 | Tachiiri et al. | |
| 2006/0169552 | A1 | 8/2006 | Sakashita et al. | |

FOREIGN PATENT DOCUMENTS

| | | |
|---|---|---|
| JP | 2004-324806 A | 11/2004 |
| JP | 2006-017158 A | 1/2006 |
| JP | 2006-207762 A | 8/2006 |
| JP | 2008-019973 A | 1/2008 |

* cited by examiner

*Primary Examiner* — Robert Pezzuto
(74) *Attorney, Agent, or Firm* — Buchanan Ingersoll & Rooney PC

(57) ABSTRACT

A cable-type driving force transmission mechanism includes a driving member including first and second end pin attachment holes, a cable including an inner wire and an outer tube, whose one end is detachably and immovably attached to an outer tube attachment portion, a cable end pin including a shaft portion and first and second arm portions, and a first plate spring including first and second engagement pieces for rotating the cable end pin and for restricting an inverse direction of the cable end pin, wherein the end pin attachment hole includes a rotation allowing hole portion and a deformation allowing hole portion, and an end portion of the inner wire is connected to the driving member via the cable end pin and the end portion of the outer tube is attachable to the outer tube attachment portion from an outside of the housing.

10 Claims, 33 Drawing Sheets

F I G. 2
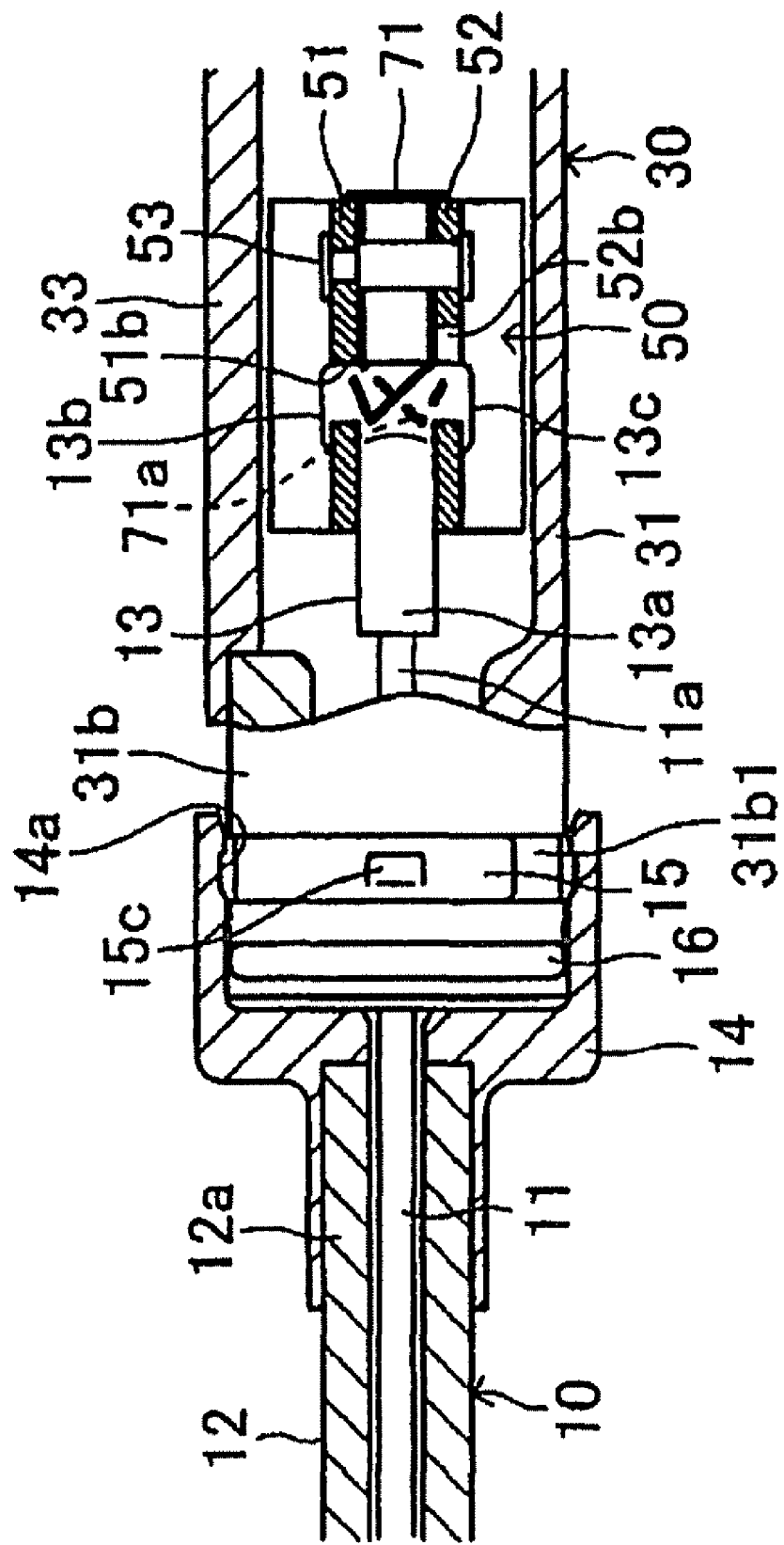

CABLE-TYPE DRIVING FORCE TRANSMISSION MECHANISM

CROSS REFERENCE TO RELATED APPLICATIONS

This application is based on and claims priority under 35 U.S.C. §119 to Japanese Patent Application 2008-025070, filed on Feb. 5, 2008, and Japanese Patent Application 2008-235574, filed on Sep. 12, 2008, the entire contents of which are incorporated herein by reference.

FIELD OF THE INVENTION

The present invention relates to a cable-type driving force transmission mechanism.

BACKGROUND

Disclosed in JP2006-17158A is an example of a cable-type driving force transmission mechanism, which is adapted to an electric parking brake apparatus for a vehicle. An electric actuator of the cable-type driving force transmission mechanism disclosed in JP2006-17158A includes a housing attached to a vehicle body (a support member), an electric motor attached to the housing, a conversion mechanism that is provided within the housing and converts a rotational driving force of the electric motor into a linear driving force, and a driving member (an equalizer) that is linearly driven by the linear driving force, which is generated by converting the rotational driving force of the electric motor by the conversion mechanism. Further, a cable of the cable-type driving force transmission mechanism disclosed in JP2006-17158A includes an inner wire, which is detachably connected to the equalizer at an end portion of the inner wire and which is connected to an actuation member of each parking brake apparatus at the other end of the inner wire, and an outer tube, which covers an outer circumference of the inner wire except for both end portions thereof. The outer tube is detachably and immovably connected to an outer tube attachment portion, which is provided at the housing, at an end portion of the outer tube at a housing side. Further, the outer tube is immovably assembled to a retaining member for retaining the actuation member at an end portion of the outer tube at an actuation member side.

In the electric parking brake apparatus for the vehicle disclosed in JP2006-17158A, a pair of through holes, which are provided at respective output portions of the equalizer (i.e. swing portions formed in a U-shape to open towards respective inner wires) and which pass through the respective output portions of the equalizer in a direction orthogonal to a wire longitudinal direction, and a notch, which is provided at one of the through holes for opening a portion of the through hole in a direction orthogonal to the wire longitudinal direction and the through hole, are adapted as a connection means for connecting each of the output portions of the equalizer and each of one end portions of the respective inner wires. Further, an I-shaped connecting pin portion is integrally provided at one end portion of each inner wire so as to be orthogonal to the wire longitudinal direction. A portion of I-shaped connecting pin portion is inserted into the pair of through holes via the notch, so that the I-shaped connecting pin portion is fittedly fixed on the pair of through holes at both end portions of the I-shaped connecting pin portion.

In the electric parking brake apparatus for the vehicle disclosed in JP2006-17158A, an annular groove is formed on the outer tube, which covers the outer circumference of the inner wire, at the end portion of the outer tube at the housing side. A portion of the housing is fit into the annular groove, so that the end portion of the outer tube at the housing side is immovably retained at the housing.

In the electric parking brake apparatus for the vehicle disclosed in JP2006-17158A, the I-shaped connecting pin portion, which is provided at one end portion of each inner wire, needs to be attached to each of the output portions (swing portions) of the equalizer, which is provided within the housing, and the end portion of each outer tube at the housing side needs to be attached to a portion of the housing in the manner where the portion of the housing is fit on the annular groove formed at the end portion of each outer tube at the housing side. Therefore, each cable needs to be attached to the housing during an assembly process of the electric actuator. In a state where the equalizer, the inner wires, outer tubes and the like are assembled to the housing, the housing and the cable need to be handled as a unit. In other words, relatively long and unhandy cables need to be handled in a process of a production line of the electric parking brake apparatus, which may deteriorate productivity.

A need thus exists to provide a cable-type driving force transmission mechanism which is not susceptible to the drawback mentioned above.

SUMMARY OF THE INVENTION

According to an aspect of the present invention, a cable-type driving force transmission mechanism includes an electric actuator including a housing attached to a support member, an electric motor attached at the housing, a conversion mechanism, which is provided within the housing and converts a rotational driving force of the electric motor into a linear driving force, and a driving member, which is linearly driven by the linear driving force generated by converting the rotational driving force of the electric motor into the linear driving force by the conversion mechanism and which includes first and second end pin attachment holes, a cable provided between the electric actuator and an actuation member for transmitting a driving force of the electric actuator to the actuation member via the cable and including an inner wire, which is detachably connected to the driving member at a first end portion of the inner wire and which is connected to the actuation member at a second end portion of the inner wire, and an outer tube, which covers an outer circumference of the inner wire except for both end portions thereof and which is detachably and immovably attached to an outer tube attachment portion, provided at the housing at an end portion of the outer tube at a housing side and is immovably attached to a retaining member for retaining the actuation member at an end portion of the outer tube at an actuation member side, a cable end pin formed in a T-shape and fixed at the first end portion of the inner wire, the cable end pin including a shaft portion extending in a wire longitudinal direction and first and second arm portions, each of which outwardly protrudes from an end portion of the shaft portion for a predetermined amount in a radial direction thereof, and a first plate spring fixed at the driving member and including first and second engagement pieces for rotating the cable end pin in a positive direction by substantially 90 degrees with the shaft portion with an axis while the first and second engagement pieces elastically deform and engage with different side surface of the first and second arm portions when the first and second arm portions of the cable end pin is inserted and attached between the first and second end pin attachment holes of the driving member and for restricting an inverse direction of the cable end pin by returning to an initial position after the cable end pin is rotated in the positive direction, wherein each of the first and second end pin attachment holes includes a rotation allowing hole portion for allowing a rotation of each arm portion and a deformation allowing hole portion for allowing an elastic deformation of each engagement piece of the first plate spring when the cable end pin is rotated in the positive direction with the shaft portion thereof as the axis, and wherein the first end portion of the inner wire is connected to the driving member via the cable end pin and the end portion of the outer tube at the housing side is attachable relative to the outer tube attachment portion, provided at the housing, from an outside of the housing.

BRIEF DESCRIPTION OF THE DRAWINGS

The foregoing and additional features and characteristics of the present invention will become more apparent from the following detailed description considered with the reference to the accompanying drawings, wherein:

FIG. 2 is a partial cutaway side view illustrating a relationship between one of cables, a housing, a cable end pin, a first plate spring, an equalizer and the like illustrated in FIG. 1;

DETAILED DESCRIPTION

[First Embodiment]

Figure 1:
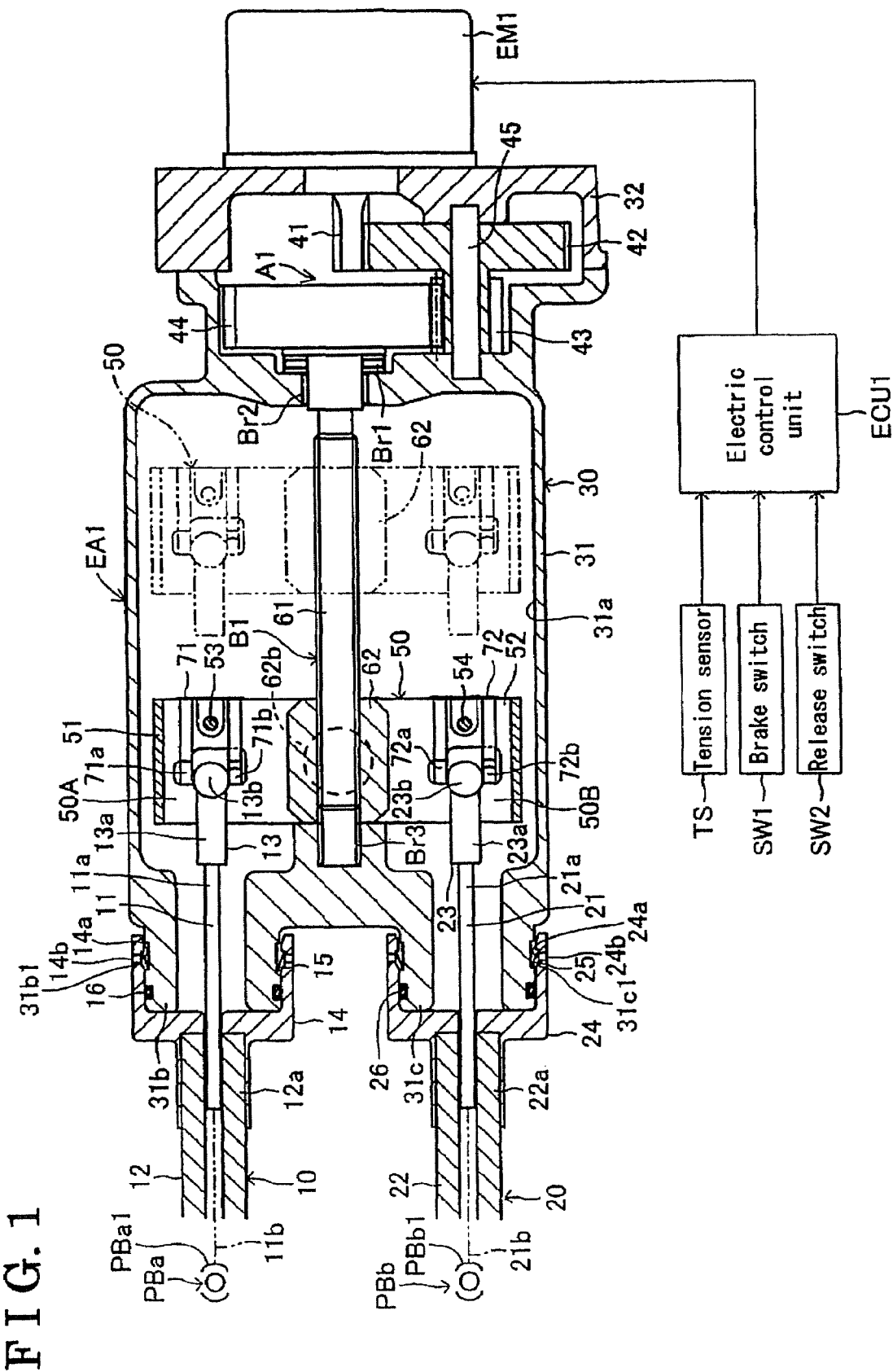
FIG. 1 is a cross-sectional plan view schematically illustrating a first embodiment in which a cable-type driving force transmission mechanism is adapted to an electric parking brake apparatus for a vehicle.

Embodiments of a cable-type driving force transmission mechanism will be described below in accordance with the attached drawings. A first embodiment in which the cable-type driving force transmission mechanism is adapted to an electric parking brake apparatus for a vehicle is illustrated in FIGS. 1 to 21. In the first embodiment, as illustrated in FIG. 1, cables 10 and 20 are provided between an electric actuator EA1, which is attached to a vehicle body, and a pair of parking brake apparatuses PBa and PBb, respectively, so that a driving force of the electric actuator EA1 is transmitted to each of the parking brake apparatuses PBa and PBb via each of the cables 10 and 20.

The electric actuator EA1 includes a housing 30 that is attached to the vehicle body, an electric motor EM1, which is attached to a housing main body 31 of the housing 30 via a housing side member 32, a speed reduction mechanism A1, which is provided within an accommodation portion formed by the housing main body 31 and the housing side member 32 and which reduces and transmits a rotational driving force, which is an output of the electric motor EM1, a conversion mechanism B1, which is provided within an accommodation portion (i.e. within the housing 30) formed by the housing main body 31 and a housing upper member 33 (see FIG. 2) and which converts the rotational driving force of the electric motor EM1, transmitted to the conversion mechanism B1 via the speed reduction mechanism A1, into a linear driving force, and an equalizer 50, which is driven by the liner driving force, generated by converting the rotational driving force of the electric motor EM1 by the conversion mechanism B1, and which distributes the linear driving force to two output portions 50A and 50B.

In the housing 30 illustrated in FIG. 1, an opening 31a is provided at an upper portion of the housing main body 31, so that each component such as the conversion mechanism B1, the equalizer 50 and the like is assembled within the housing 30 or detached therefrom for exchange via the opening 31a. The housing 30 is formed with the housing main body 31, the housing side member 32 and the housing upper member 33. The housing side member 32 and the housing upper member 33 are detachably attached to the housing main body 31 so as to fluid-tightly seal an inner space of the housing 30. The opening 31a of the housing main body 31 is sealable by the housing upper member 33.

The electric actuator EA1 includes a tension sensor TS, which detects a tensile force acting on each of inner wires 11 and 21 of the respective cables 10 and 20 and which outputs an electrical signal to an electric control unit ECU1. Additionally, the tension sensor TS may be configured so as to detect the tensile force acting on each of the inner wires 11 and 22 by detecting an axial force acting on a screw shaft 61.

Alternatively, the tension sensor TS may be configured to be incorporated in either one of or each of the inner wires 11 and 21, so that the tension sensor TS detects the tensile force acting on each of the inner wires 11 and 21.

The electric motor EM1 is attached to the housing side member 32 that is provided at one side of the housing main body 31, so that an operation of the electric motor EM1 is controlled by the electric control unit ECU1. The electric motor EM1 is, for example, rotatably driven in a positive direction by the driver operating a brake switch SW1, and is rotatably driven in an inverse direction (i.e. a direction opposite from the positive direction) by the driver operating a release switch SW2.

The speed reduction mechanism A1 is provided within the accommodation portion formed between the housing main body 31 and the housing side member 32. The speed reduction mechanism A1 includes an input small gear 41, which is attached to an output shaft of the electric motor EM1 and which is integrally rotated with the output shaft of the electric motor EM1, and an output large gear 44, which is attached to an end portion of the screw shaft 61 and which is integrally rotated with the screw shaft 61. Further, the speed reduction mechanism A1 includes an intermediate large gear 42 and an intermediate small gear 43, which are rotatably provided between the housing main body 31 and the housing side member 32 via a support shaft 45. The intermediate large gear 42 is normally engaged with the input small gear 41. The intermediate small gear 43 is integrally rotatable with the intermediate large gear 42 and normally engages with the output large gear 44. Hence, the output of the electric motor EM1 is transmitted and reduced via the input small gear 41, the intermediate large gear 42, the intermediate small gear 43 and the output large gear 44. Additionally, the wordings "large" and "small" when describing the gears do not specify sizes of the gears, but the words "large" and "small" are used simply because, for example, the output gear 44 is larger than the input gear 41 in this embodiment.

The conversion mechanism B1 is configured with the screw shaft 61 as an input element and a nut 62 as an output element. The nut 62 is screwed and attached on the screw shaft 61. In the conversion mechanism B1, when the screw shaft 61 is rotatably driven in the positive direction while the nut 62 is positioned at a parking brake release position (which will be hereinafter referred to as a release position) at the left side of FIG. 1 (a position illustrated by a solid line), the nut 62 is moved in an axial direction of the screw shaft 61 from the release position at the left side of FIG. 1 (the position illustrated by the solid line in FIG. 1) towards a parking brake actuation position (which will be hereinafter referred to as an actuation position) at the right side of FIG. 1 (a position illustrated by a chain double-dashed line in FIG. 1). Further, in the conversion mechanism B1, when the screw shaft 61 is rotatably driven in the inverse direction while the nut 62 is positioned at the actuation position at the right side of FIG. 1 (the position illustrated by the chain double-dashed line in FIG. 1), the nut 62 is moved in the axial direction of the screw shaft 61 towards the release position at the left side of FIG. 1.

The screw shaft 61 is arranged so that the axial direction thereof corresponds to a moving direction of the first and second inner wires 11 and 21 of the respective first and second cables 10 and 20. The screw shaft 61 includes an external thread. Any desired number of threads of the external thread and a shape of the external thread are adaptable. Further, the screw shaft 61 is attached to the housing main body 31 via a thrust bearing Br1 and a pair of radial bearings Br2 and Br3 so as to be rotatable and immovable in the axial direction. The nut 62 is integrally provided with a pair of connecting pins 62a and 62b, which are arranged so as to oppose each other with respect to the axial direction of the screw shaft 61 (i.e. at an upper end and a lower end of the nut 62). In this embodiment, terms "up (upper side/upward)" and "down (lower side/downward)" indicate directions or positions defined with reference to an arrangement of the cable-type driving force transmission mechanism illustrated in, for example, FIG. 2. The nut 62 is connected to the equalizer 50 by means of the connecting pins 62a and 62b, so that the nut 62 swingably (rotatably) supports the equalizer 50. More specifically, the nut 62 supports the equalizer 50 so that the equalizer 50 swings (i.e. so that the equalizer 20 rotates around the connecting pins 62a and 62b).

The equalizer 50 (a driving member) equally distributes the linear driving force acting on the nut 62 to the output portions 50A and 50B. The equalizer 50 is attached to the nut 62 at a center portion of the equalizer 50 so as to be swingable for a set amount in order to balance between the output portions 50A and 50B. Further, the equalizer 50 is connected to a first end portion 11a of the inner wire 11 of the cable 10 at the output portion 50A via a cable end pin 13. The equalizer 50 is connected to a first end portion 21a of the inner wire 21 of the cable 20 at the output portion 50B via a cable end pin 23.

Figure 3:
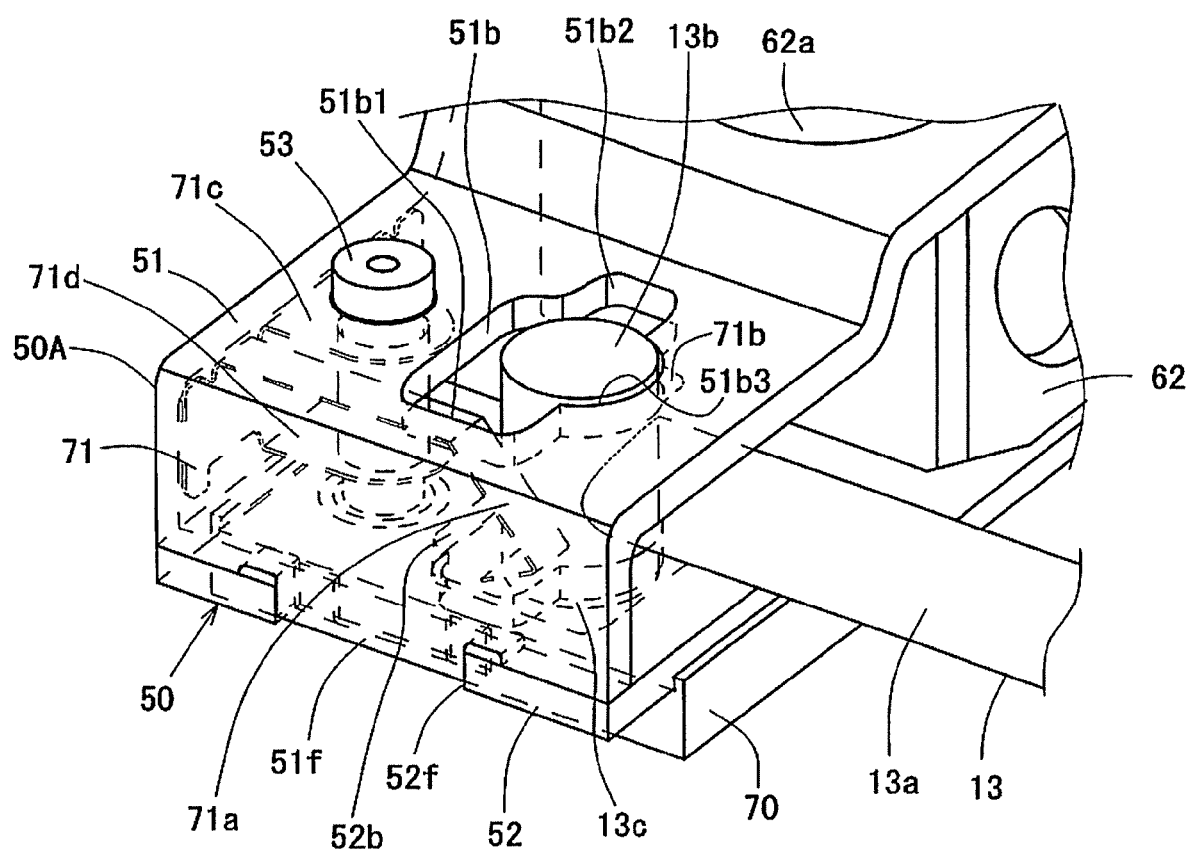
FIG. 3 is a perspective view illustrating a detailed relationship between the cable end pin, the first plate spring, the equalizer and the like illustrated in FIGS. 1 and 2.

The equalizer 50 is schematically illustrated in FIGS. 1 and 2. Further, a portion of the equalizer 50 is illustrated in FIG. 3 in detail. The equalizer 50 includes an upper member 51, which has a rectangular shape in a plane view, a lower member 52, which has a rectangular shape in a plane view and which is supported by a support plate 70 (see FIG. 3), a pair of mating pins 53 and 54 for integrally mating the upper member 51 and the lower member 52 together with a pair of first plate springs 71, 72, respectively. Additionally, the support plate 70 is slidably attached on a lower wall of the housing main body 31.

Figure 4:
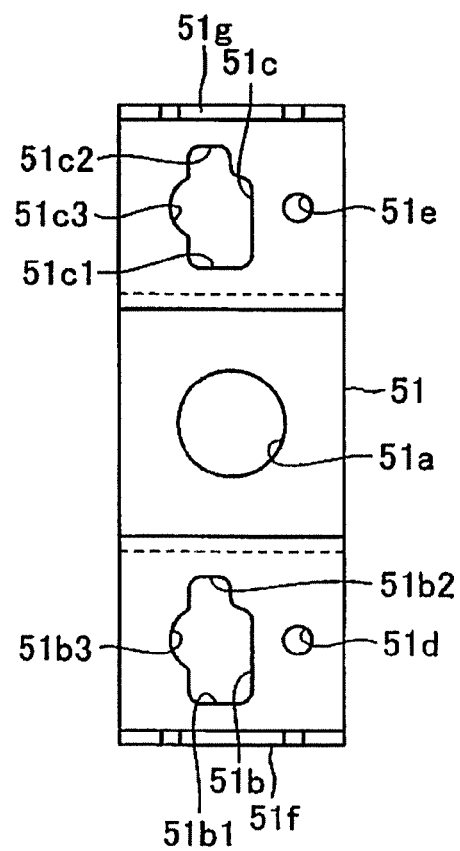
FIG. 4 is a front view of an upper member of the equalizer illustrated in FIG. 3.
Figure 5:
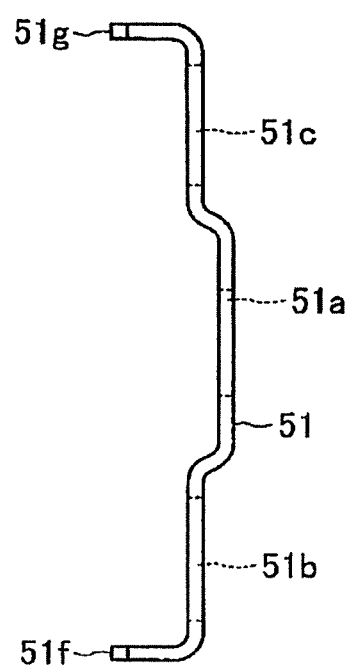
FIG. 5 is a side view of a right side of the upper member illustrated in FIG. 4.
Figure 6:
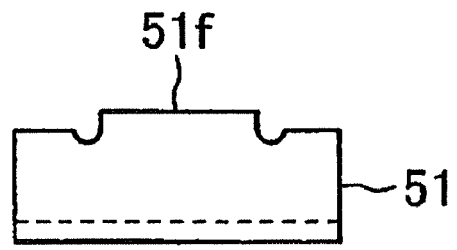
FIG. 6 is a bottom view of the upper member illustrated in FIG. 4.

As illustrated in FIGS. 4 to 6 in detail, a connecting pin insertion hole 51a is formed at a center portion of the upper member 51. Further, a pair of end pin attachment holes 51b and 51c are formed at both end portions of the upper member 51 in a longitudinal direction thereof (at a lower end portion and an upper end portion of the upper member 51 in FIG. 4), respectively. Further, a pair of mating pin attachment holes 51d and 51e are formed at the both end portions of the upper member 51 in the longitudinal direction thereof, respectively. Further protrusions 51f and 51g are formed at both ends of the upper member 51, respectively, in the longitudinal direction thereof. The connecting pin insertion hole 51a is formed in, for example, a circle, so that the connecting pin 62a, which is arranged at an upper portion of the nut 62, is rotatably fit into the connecting pin insertion hole 51a (see FIG. 3).

The end pin attachment hole 51b is formed in a non-circle. Further the end pin attachment hole 51b includes a rotation allowing hole portion 51b1 for allowing an arm portion 13b of the cable end pin 13 to rotate when the cable end pin 13 is rotated in the positive direction with a shaft portion 13a thereof as an axis, a deformation allowing hole portion 51b2 for allowing an engagement piece 71b of the first plate spring 71 to elastically upwardly deform when the cable end pin 13 is rotated in the positive direction with the shaft portion 13a thereof as the axis, and an accommodation-and-retention portion (a concave portion) 51b3 for accommodating and retaining a portion of the arm portion 13b when the cable end pin 13 is connected to the output portion 50A of the equalizer 50.

The end pin attachment hole 51c is formed in a non-circle. Further the end pin attachment hole 51c includes a rotation allowing hole portion 51c1 for allowing an arm portion 23b of the cable end pin 23 to rotate when the cable end pin 23 is rotated in the positive direction with a shaft portion 23a thereof as an axis, a deformation allowing hole portion 51c2 for allowing an engagement piece 72b of the first plate spring 72 to elastically upwardly deform when the cable end pin 23 is rotated in the positive direction with the shaft portion 23a thereof as the axis, and an accommodation-and-retention portion (a concave portion) 51c3 for accommodating and retaining a portion of the arm portion 23b when the cable end pin 23 is connected to the output portion 50B of the equalizer 50.

The mating pin attachment hole 51d is formed in, for example, a circle, so that a smaller diameter shaft portion of the mating pin 53 is fitted into and calks the mating pin attachment hole 51d (see FIG. 2). The mating pin attachment hole 51e is formed in, for example, a circle, so that a smaller diameter shaft portion of the mating pin 54 is fitted into and calks the mating pin attachment hole 51e. Each of the protrusions 51f and 51g is formed in a rectangular shape, and each of the protrusions 51f and 51g downwardly and integrally protrudes from each end portion of a side wall portion of the upper member 51 in the longitudinal direction thereof for a predetermined amount.

Figure 7:
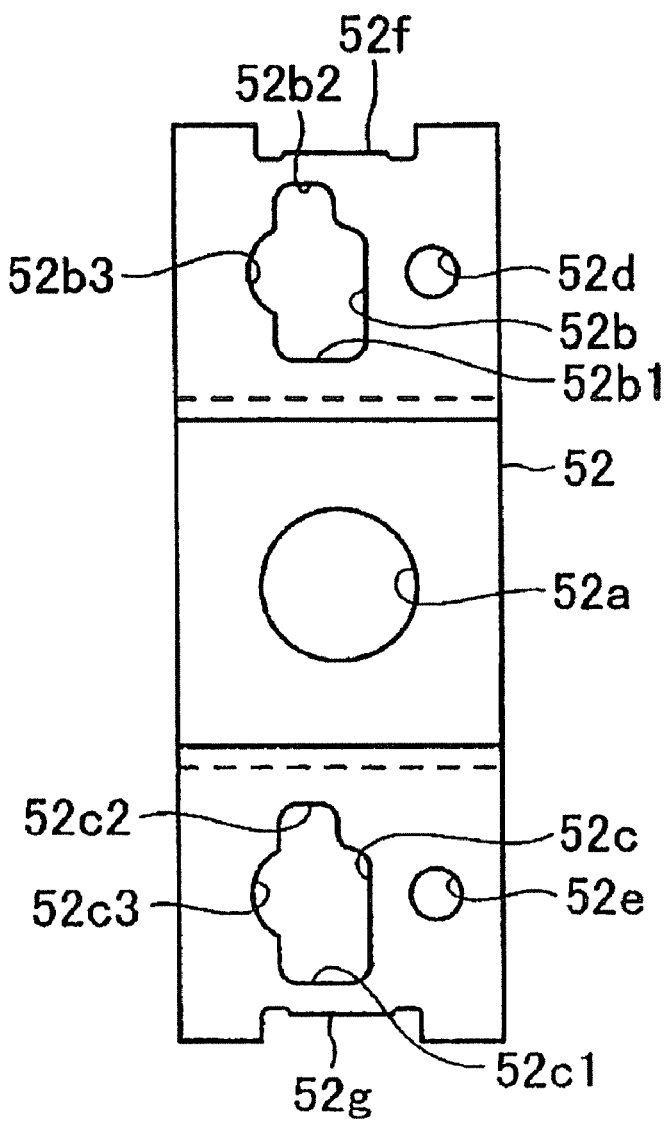
FIG. 7 is a front view of a lower member of the equalizer illustrated in FIG. 3.
Figure 8:
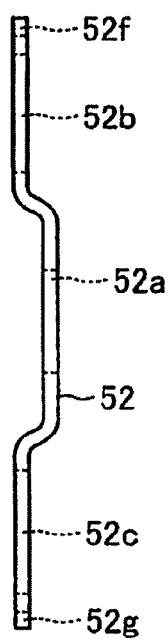
FIG. 8 is a side view of a right side of the lower member of the equalizer illustrated in FIG. 7.
Figure 9:
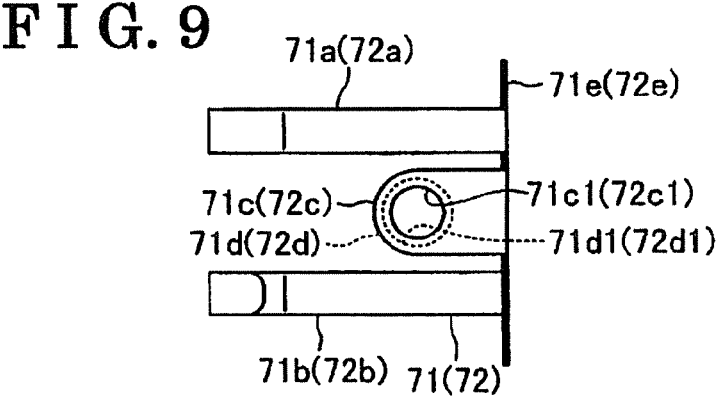
FIG. 9 is a front view of a first plate spring illustrated in FIGS. 1 to 3.
Figure 10:
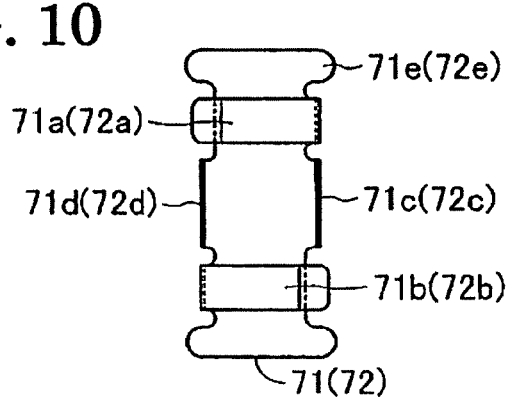
FIG. 10 is a side view of a left side of the first plate spring illustrated in FIG. 9.
Figure 11:
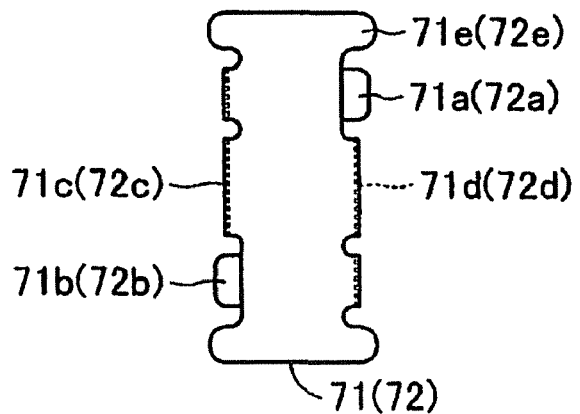
FIG. 11 is a side view of a right side of the first plate spring illustrated in FIG. 9.
Figure 12:
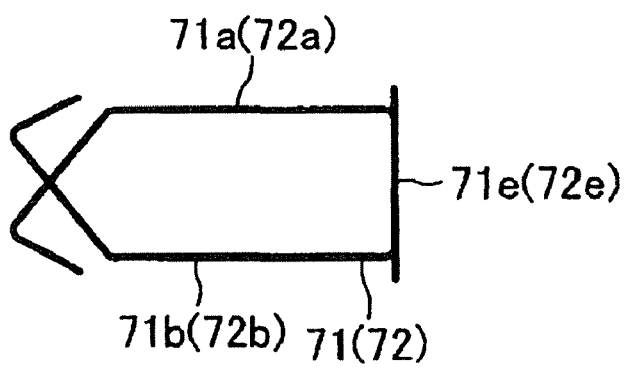
FIG. 12 is a bottom view of the first plate spring illustrated in FIG. 9.

As illustrated in FIGS. 7 and 8 in detail, a connecting pin insertion hole 52a is formed at a center portion of the lower member 52. Further, a pair of end pin attachment holes 52b and 52c are formed at both end portions of the lower member in a longitudinal direction thereof (i.e. at a lower end portion and an upper end portion of the lower member 52 in FIG. 7), respectively. Further, a pair of mating pin attachment holes 52d and 52e are formed at the both end portions of the lower member 52 in a longitudinal direction thereof. Further, cut-out portions 52f and 52g are formed at the both ends of the lower member 52, respectively, in the longitudinal direction thereof. The connecting pin insertion hole 52a is formed in, for example, a circle, so that the connecting pin 62b, which is arranged at a lower portion of the nut 62, is rotatably fit into the connecting pin insertion hole 52a.

The end pin attachment hole 52b is formed in a non-circle. Further the end pin attachment hole 52b includes a rotation allowing hole portion 52b1 for allowing an arm portion 13c of the cable end pin 13 to rotate when the cable end pin 13 is rotated in the positive direction with the shaft portion 13a thereof as the axis, a deformation allowing hole portion 52b2 for allowing an engagement piece 71a of the first plate spring 71 to elastically downwardly deform when the cable end pin 13 is rotated in the positive direction with the shaft portion 13a thereof as the axis, and an accommodation-and-retention portion (a concave portion) 52b3 for accommodating and retaining a portion of the arm portion 13c when the cable end pin 13 is connected to the output portion 50A of the equalizer 50.

The end pin attachment hole 52c is formed in a non-circle. Further, the end pin attachment hole 52c includes a rotation allowing hole portion 52c1 for allowing an arm portion 23c of the cable end pin 23 to rotate when the cable end pin 23 is rotated in the positive direction with the shaft portion 23a thereof as the axis, a deformation allowing hole portion 52c2 for allowing an engagement piece 72a of the first plate spring 72 to elastically downwardly deform when the cable end pin 23 is rotated in the positive direction with the shaft portion 23a thereof as the axis, and an accommodation-and-retention portion (a concave portion) 52c3 for accommodating and retaining a portion of the arm portion 23c when the cable end pin 23 is connected to the output portion 50B of the equalizer 50.

The mating pin attachment hole 52d is formed in, for example, a circle, so that a greater diameter shaft portion of the mating pin 53 is fitted into and calks the mating pin attachment hole 52d (see FIG. 2). The mating pin attachment hole 52e is formed in, for example, a circle, so that a greater diameter shaft portion of the mating pin 54 is fitted into and calks the mating pin attachment hole 52e. Each of the cut-out portions 52f and 52g is formed in a rectangular shape, and each of the protrusions 51f and 51g is engageable with each of the cut-out portions 52f and 52g.

The first plate springs 71 and 72 are formed to have the same shape. Hence, the detailed description of the first plate springs 71 and 72 will be given with the first plate spring 71 as an example. Further, reference numerals of the corresponding parts of the second plate spring 72 will be indicated within brackets. As illustrated in FIGS. 9 to 12 in detail, a pair of the engagement pieces 71a and 71b (72a and 72b) (first and second engagement pieces), and a pair of attachment pieces 71c and 71d (72c and 72d) are formed at the first plate spring 71 (72). As illustrated in FIG. 3, the engagement piece 71a (72a) integrally extends from an upper portion of a base portion 71e (72e) of the first plate spring 71 (72) in the direction corresponding to a wire longitudinal direction. An end portion of the engagement piece 71a (72a) is formed to downwardly incline towards an end portion thereof (see FIG. 12), which is positioned opposite from the first base portion 71e (72e), so that the engagement piece 71a (72a) is engaged with the arm portion 13b (23b) at a lower portion thereof, when the cable end pin 13 (23) is attached between the pair of the end pin attachment holes 51b and 52b (51c and 52c) (first and second end pin attachment holes), which are formed at the output portion 50A (50B) of the equalizer 50, by inserting the cable end pin 13 (23) between the pair of the end pin attachment holes 51b and 52b (51c and 52c) from a side of the arm portions 13b and 13c (23b and 23c) (first and second arm portions).

The engagement piece 71b (72b) integrally extends from a lower portion of the base portion 71e (72e) in the same direction as the engagement piece 71a (72a) extends. An end portion of the engagement piece 71b (72b) is formed to upwardly incline towards an end portion thereof (see FIG. 12), which is positioned opposite from the first base portion 71e (72e), so that the engagement piece 71b (72b) is engaged with the arm portion 13c (23c) at an upper portion thereof, when the cable end pin 13 (23) is attached between the pair of the end pin attachment holes 51b and 52b (51c and 52c), which are formed at the output portion 50A (50B) of the equalizer 50, by inserting the cable end pin 13 (23) between the pair of the end pin attachment holes 51b and 52b (51c and 52c) from the side of the arm portions 13b and 13c (23b and 23c).

Hence, when the cable end pin 13 (23) is attached between the pair of the end pin attachment holes 51b and 52b (51c and 52c), which are formed at the output portion 50A (50B) of the equalizer 50, by inserting the cable end pin 13 (23) between the pair of the end pin attachment holes 51b and 52b (51c and 52c) from the side of the arm portions 13b and 13c (23b and 23c), the engagement pieces 71a and 71b (72a and 72b) returns to an initial position illustrated in FIG. 3 and restricts an inverse rotation of the cable end pin 13 (23) after the engagement pieces 71a and 71b (72a and 72b) rotates the cable end pin 13 (23) in the positive direction by approximately 90 degrees with the shaft portion 13a (23a) as the axis while each of the engagement pieces 71a and 71b (72a and 72b) is engaged with each of the arm portions 13b and 13c (23b and 23c) at different side surfaces thereof and while each of the engagement pieces 71a and 71b (72a and 72b) elastically deforms, and then, the cable end pin 13 (23) further rotates in the positive direction.

The attachment piece 71c (72c) integrally extends from the upper portion of the base portion 71e (72e) in the same direction as the engagement piece 71a (72a) extends. Further, the attachment piece 71c (72c) includes an attachment hole 71c1 (72c1) into which the smaller diameter shaft portion of the mating pin 53 (54) is fitted. The attachment piece 71d (72d) integrally extends from the lower portion of the first base portion 71e (72e) in the same direction as the engagement piece 71a (72a) extends. Further, the attachment piece 71d (72d) includes an attachment hole 71d1 (72d1) into which the greater diameter shaft portion of the mating pin 53 (54) is fitted (see FIGS. 3 and 9).

As illustrated in FIG. 1, the cable 10 includes the inner wire 11 and an outer tube 12. The inner wire 11 is detachably connected to the output portion 50A of the equalizer 50 at the first end portion 11a via the cable end pin 13. Further, the inner wire 11 is detachably connected to an actuation member PBa1 of the parking brake apparatus PBa at a second end portion 11b of the inner wire 11.

The outer tube 12 covers an outer circumference of the inner wire 11 except for both end portions thereof. The outer tube 12 is detachably and immovably attached to an outer tube attachment portion 31b, which is provided at the housing main body 31, at a first end portion 12a, which is positioned at the housing side, via an end cap 14, a plate spring 15 and an O-ring 16. Further, the outer tube 12 is detachably and immovably attached to a retaining member for retaining the actuation member PBa1 at a second end portion (i.e. an end portion positioned at the actuation member side) of the outer tube 12.

As illustrated in FIG. 1, the cable 20 includes the inner wire 21 and an outer tube 22. The inner wire 21 is detachably connected to the output portion 50B of the equalizer 50 at the first end portion 21a via the cable end pin 23. Further, the inner wire 21 is detachably connected to an actuation member PBb1 of the parking brake apparatus PBb at a second end portion 21b of the inner wire 21.

The outer tube 22 covers an outer circumference of the inner wire 21 except for both end portions thereof. The outer tube 22 is detachably and immovably attached to an outer tube attachment portion 31c, which is provided at the housing main body 31, at a first end portion 22a, which is positioned at the housing side, via an end cap 24, a plate spring 25 and an O-ring 26. Further, the outer tube 22 is detachably and immovably attached to a retaining member for retaining the actuation member PBb1 at a second end portion (i.e. an end portion positioned at the actuation member side) of the outer tube 22.

Figure 13:
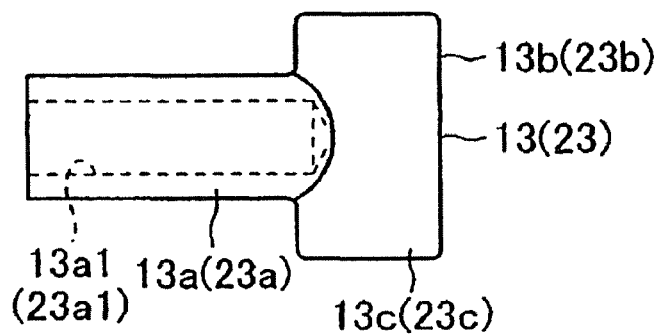
FIG. 13 is a front view of a cable end pin illustrated in FIGS. 1 to 3.
Figure 14:
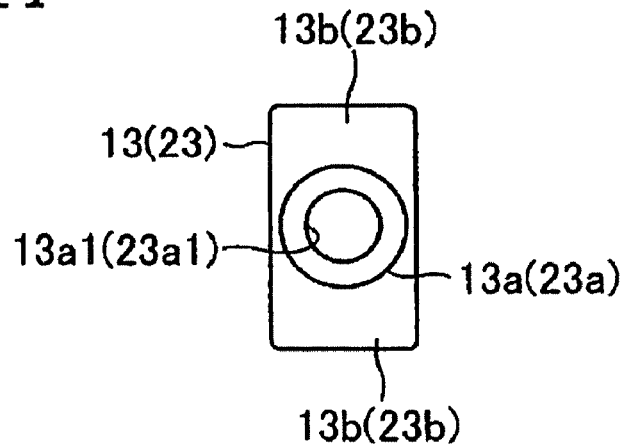
FIG. 14 is a side view of a left side of the cable end pin illustrated in FIG. 13.

The cable end pins 13 and 23 are formed to have the same shape. Hence, the detailed description of the cable end pins 13 and 23 will be given with the cable end pin 13 as an example. Further, reference numerals of the corresponding parts of the cable end pin 23 will be indicated within brackets. As illustrated in FIGS. 13 and 14 in detail, the cable end pin 13 (23) is formed in a T-shape. The cable end pin 13 (23) integrally includes the shaft portion 13a (23a), which extends in the wire longitudinal direction and which is formed in a cylindrical shape, and the arm portions 13b and 13c (23b and 23c), which protrude from respective end portions of the shaft portion 13a in a radial direction thereof for a predetermined amount and whose cross-sections are formed in a circle.

In the cable end pin 13 (23), the first end portion 11a (21a) of the inner wire 11 (21) is fixed at an attachment bore 13a1 (23a1), which is coaxially formed at the shaft portion 13a (23a), by means of a fixing means such as a weld (or, by calking) or the like in a state where the first end portion 11a (21a) of the inner wire 11 (21) is fitted into the attachment bore 13a1 (23a1). As a result, the cable end pin 13 (23) is fixed at the first end portion 11a (21a) of the inner wire 11 (21) (see FIG. 1). Further, the cable end pin 13 (23) is configured so as to be insertable into/removable from the housing main body 31 via the outer tube attachment portion 31b (31c) of the housing main body 31 in the state where the cable end pin 13 (23) is fixed at the first end portion 11a (21a) of the inner wire 11 (21).

The end cap 14 is inseparably attached to the first end portion 12a of the outer tube 12 at a smaller diameter cylinder portion of the end cap 14. Further, the end cap 14 is detachably attached to the outer tube attachment portion 31b of the housing main body 31 at a greater diameter cylinder portion of the end cap 14 via the plate spring 15. Similarly, the end cap 24 is inseparably attached to the first end portion 22a of the outer tube 22 at a smaller diameter cylinder portion of the end cap 24. Further, the end cap 24 is detachably attached to the outer tube attachment portion 31c of the housing main body 31 at a greater diameter cylinder portion of the end cap 24 via the plate spring 25.

Figure 15:
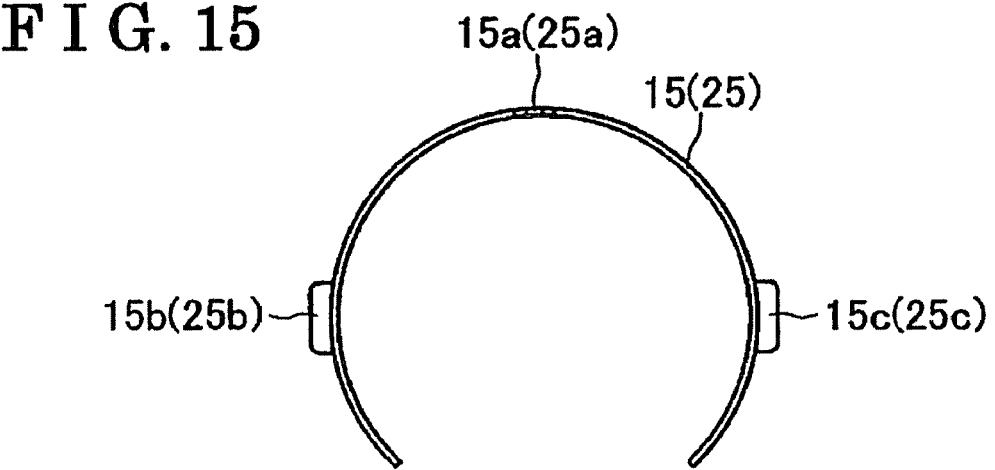
FIG. 15 is an enlarged front view of a C-shaped plate spring illustrated in FIGS. 1 and 2.
Figure 16:
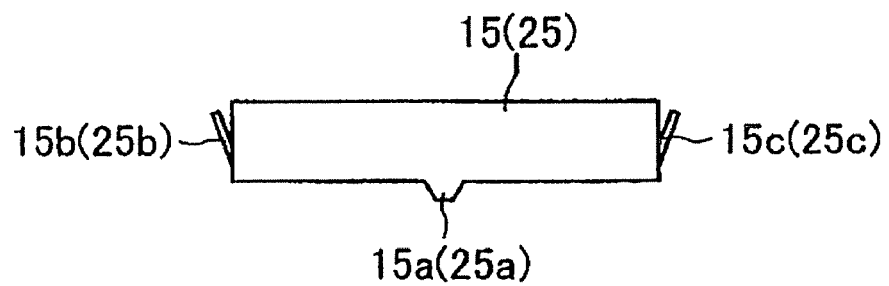
FIG. 16 is a plan view of the C-shaped plate spring illustrated in FIG. 15.
Figure 17:
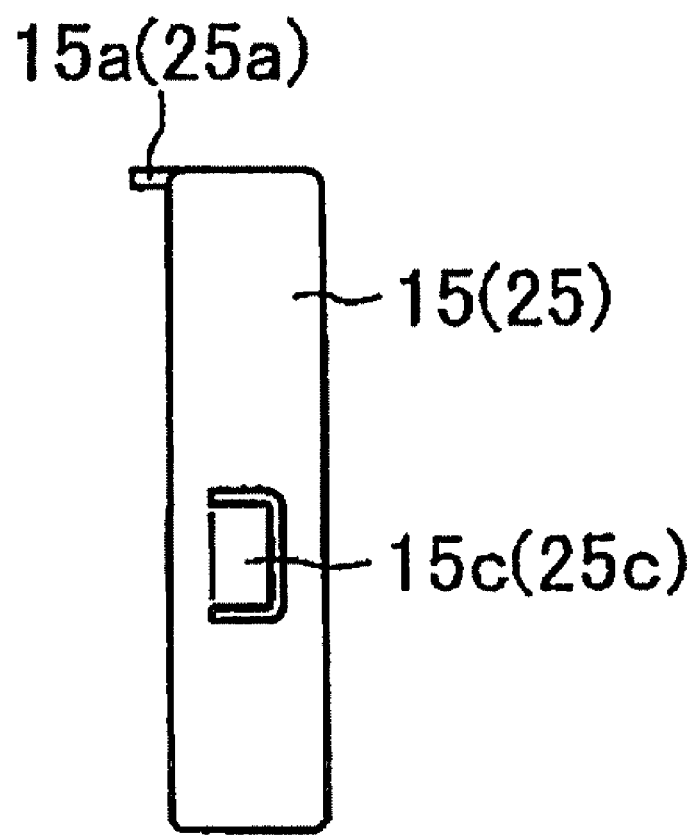
FIG. 17 is a side view of a right side of the C-shaped plate spring illustrated in FIG. 15.

The plate springs 15 and 25 are formed to have the same shape. Hence, the detailed description of the plate springs 15 and 25 will be given with the plate spring 15 as an example. Further, reference numerals of the corresponding parts of the plate spring 25 will be indicated within brackets. As illustrated in FIGS. 15 to 17 in detail, the plate spring 15 (25) is formed in a C-shape, so that the plate spring 15 (25) is fittedly fixed within an annular groove 31b1 (31c1), which is provided at an outer circumference of the outer tube attachment portion 31b (31c), as illustrated in FIG. 1. Further, the plate spring 15 (25) includes a protrusion 15a (25a) for restricting a rotation of the plate spring 15 (25) within the annular groove 31b1(31c1), and a pair of engagement nail portions 15b and 15c (25b and 25c) for engaging the plate spring 15 (25) with an annular groove 14a (24a) formed at an inner circumference of the greater diameter cylinder portion of the end cap 14 (24).

The engagement between each of the engagement nail portions 15b and 15c (25b and 25c) and the annular groove 14a (24a) is released by pushing each of the engagement nail portions 15b and 15c (25b and 25c) by inserting a tool into an insertion small hole 14b (24b) provided at the end cap 14 (24) from outside of the housing 30. In the state where the engagement between each of the engagement nail portions 15b and 15c (25b and 25c) and the annular groove 14a (24a) is cancelled, the end cap 14 (24) is pullable and detachable from the outer tube attachment portion 31b (31c) of the housing main body 31. Further, the end cap 14 (24) is attachable to the housing 30 by simply fitting the end cap 14 (24) onto the outer tube attachment portion 31b (31c) of the housing main body 31 to which the plate spring 15 (25) and the O-ring 16 (26) are attached.

In the first embodiment in which the cable-type driving force transmission mechanism has the above-configuration, when the brake switch SW1 is operated while the parking brake apparatuses PBa and PBb are not actuated (i.e. a release state), the electric motor EM1 is rotatably driven in the positive direction and the screw shaft 61 of the conversion mechanism B1 is rotated in the positive direction, thereby moving the nut 62 and the equalizer 50 in the axial direction of the screw shaft 61 from the left position in FIG. 1 (i.e. the release position) towards the right position in FIG. 1 (i.e. the actuation position). Accordingly, the inner wires 11 and 21 of the respective cables 10 and 20 are pulled, and therefore, the parking brake apparatuses PBa and PBb are shifted from the release state to an actuation state (a braking state).

When the inner wires 11 and 21 of the respective cables 10 and 20 are pulled, the tensile forces acting on the wires 11 and 21 of the respective cables 10 and 20 are detected by the tension sensor TS. The detected tensile force of each of the inner wires 11 and 21 is inputted to the electric control unit ECU1. When the inputted value of the tensile force reaches a first set value (a brake determination value), the electric motor EM1 is stopped being rotatably driven in the positive direction on the basis of a control signal from the electric control unit ECU 1. Additionally, when the electric motor EM1 is stopped being rotatably driven in the positive direction, the screw shaft 61 is retained in a state where an inverse rotation of the screw shaft 61 is restricted by the conversion mechanism B1 and the speed reduction mechanism A1. Hence, the actuation state of the parking brake apparatuses PBa and PBb is maintained.

Further, in a case where the release switch SW2 is operated while the parking brake apparatuses PBa and PBb are in the actuation states, the electric motor EM1 is driven in the inverse direction and the screw shaft 61 of the conversion mechanism B1 is rotated in the inverse direction, thereby moving the nut 62 and the equalizer 50 to the left position (the release position) from the right position (the actuation position) in FIG. 1. Accordingly, the inner wires 11 and 21 of the respective cables 10 and 20 are relaxed, so that the parking brake apparatuses PBa and PBb are shifted from the actuation state to the release state.

Even when the inner wires 11 and 21 of the respective cables 10 and 20 are relaxed, the tensile force acting on each of the inner wires 11 and 21 of the respective cables 10 and 20 is detected by the tension sensor TS. The detected tensile forces are inputted to the electric control unit ECU 1. When the inputted value reaches a second set value (a release determination value) that is set to be lower than the first set value, the electric motor EM1 is stopped being rotatably driven in the inverse direction on the basis of the control signal from the electric control unit EUC1.

In the first embodiment, while the first plate springs 71 and 72 are attached to the output portions 50A and 50B of the equalizer 50, respectively, each of the cable end pins 13 and 23 is connectable to each of the output portions 50A and 50B of the equalizer 50, more specifically, each of the first end portions 11a and 21a of the respective inner wires 11 and 21 is connectable to each of the output portions 50A and 50B of the equalizer 50 via each of the cable end pins 13 and 23 in a manner where: firstly, each of the cable end pins 13 and 23, formed in T-shapes and fixed at each of the first end portions 11a and 21a of the respective inner wires 11 and 21, is inserted between each of the pairs of the end pin attachment holes 51b and 52b, 51c and 52c, formed at each of the output portions 50A and 50B of the equalizer 50, from a side of the pair of the arm portions 13b and 13c, 23b and 23c; and then, each of the cable end pins 13 and 23 is rotated in the positive direction by substantially 90 degrees with each of the shaft portions 13a and 23a as the axis by each pairs of the engagement pieces 71a and 71b of the plate spring 71 and the engagement pieces 72a and 72b of the first plate spring 72, as a relationship between the cable end pin 13 and the output portion 50A of the equalizer 50 is illustrated in detail in FIGS. 18 to 21.

Therefore, each of the first end portions 11a and 21a of each of the inner wires 11 and 21 is connected to each of the output portions 50A and 50B of the equalizer 50 via each of the cable end pins 13 and 23 in the state where the equalizer 50, to which the first plate springs 71 and 72 are preliminarily attached, is assembled within the housing 30, by inserting each of the cable end pins 13 and 23, formed in the T-shapes and fixed at each of the first end portions 11a and 21a of the respective inner wires 11 and 21, into the housing 30 from the outside of the housing 30 via each of the outer tube attachment portions 31b and 31c of the housing 30 before each of the first end portions 12a and 22a of the respective outer tubes 12 and 22 is attached to each of the outer tube attachment portions 31b and 31c provided at the housing 30. Additionally, each of the first end portions 12a and 22a of the respective outer tubes 12 and 22 of the respective cables 10 and 20 is detachable from each of the outer tube attachment portions 31b and 31c, which are provided at the housing 30, from the outside of the housing 30.

Accordingly, assembling of the end portions of the cables 10 and 20, which are positioned at the housing side, after each component (i.e. the speed reduction mechanism A1, the conversion mechanism B1, the equalizer 50 and the like) is assembled within the housing 30, is achieved only with the above-mentioned relating components. Therefore, productivity of the cable-type driving force transmission mechanism is enhanced because each of the cables 10 and 20 does not need to be handled in a state where each of the cables 10 and 20 is assembled to the housing 30 in a production process in a production line. Further, in the state where the cable end pins 13 and 23 are assembled to the output portions 50A and 50B of the equalizer 50, respectively (see FIGS. 3 and 21), the engagement pieces 71a and 71b of the first plate spring 71 and the engagement pieces 72a and 72b of the plate spring 72 are returned to the initial positions (see FIG. 18), so that the engagement pieces 71a and 71b, 72a and 72b restrict the inverse rotations of the cable end pins 13 and 23, respectively. Accordingly, the connection between the cable end pins 13 and 23 and the equalizer 50 is surely maintained.

Further, in the first embodiment, the accommodation-and-retention portion 51b3 and 52b3 are formed at the respective end pin attachment holes 51b and 52b, formed at the output portion 50A of the equalizer 50, for accommodating and retaining therein portions of the arm portions 13b and 13c, respectively, after the cable end pin 13 is rotated in the positive direction. Similarly, the accommodation-and-retention portion 51c3 and 52c3 are formed at the respective end pin attachment holes 51c and 52c, formed at the output portion 50B of the equalizer 50, for accommodating and retaining therein portions of the arm portions 23b and 23c, respectively, after the cable end pin 23 is rotated in the positive direction. Hence, by each of the cable end pins 13 and 23 is attached to each of the output portions 50A and 50B of the equalizer, a portion of each of the arm portions 13b, 13c, 23b, 23c is accommodated and retained at each of the accommodation-and-retention portion 51b3, 52b3, 51c3 and 52c3 formed at the respective end pin attachment holes 51b, 52b, 51c and 52c. Accordingly, even if the tensile force of each of the inner wires 11 and 21 decreases, the cable end pin 13 is less likely to be rotated relative to each of the accommodation-and-retention portions 51b3 and 52b3 of the respective end pin attachment holes 51b and 52b, which are formed at the output portion 50A of the equalizer 50, and similarly, the cable end pin 23 is less likely to be rotated relative to each of the accommodation-and-retention portion 51c3 and 52c3 formed at the respective end pin attachment holes 51c and 52c, which are formed at the output portion 50B of the equalizer 50. Therefore, reliability at connecting portions between the equalizer 50 and each of the cable end pins 13 and 23 is enhanced.

Figure 18:
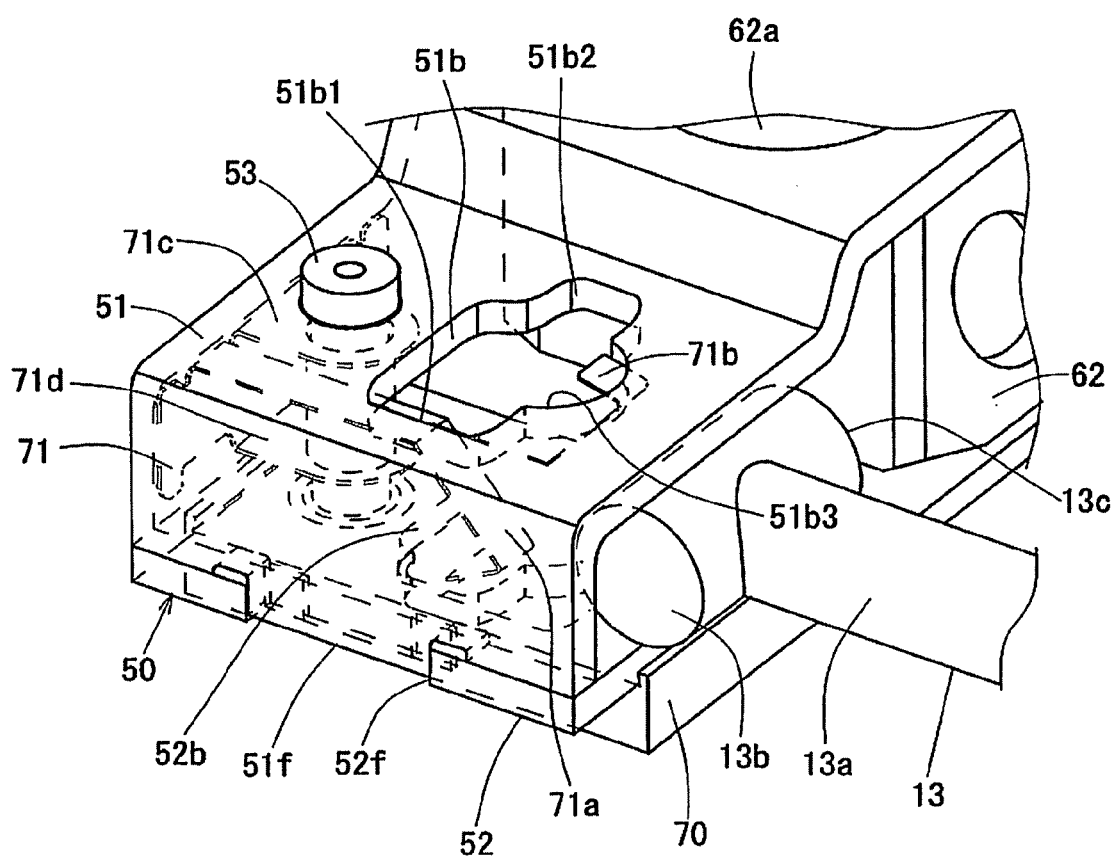
FIG. 18 is a perspective view corresponding to FIG. 3 and illustrating a process of inserting each arm portion of the cable end pin illustrated in FIGS. 1 to 3 between a pair of end pin attachment holes provided at the equalizer.
Figure 19:
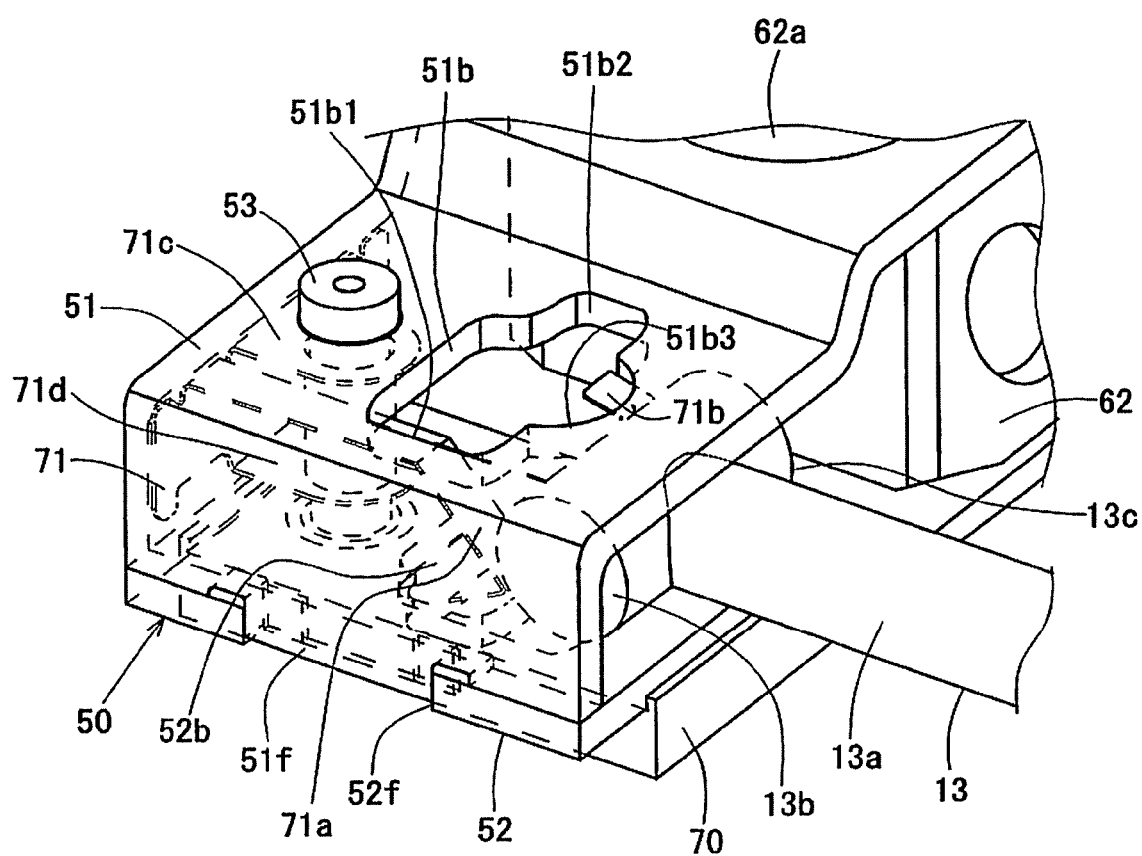
FIG. 19 is a perspective view corresponding to FIG. 3 and illustrating a state where each arm portion of the cable end pin illustrated in FIG. 18 is inserted between the pair of the end pin attachment holes of the equalizer.
Figure 20:
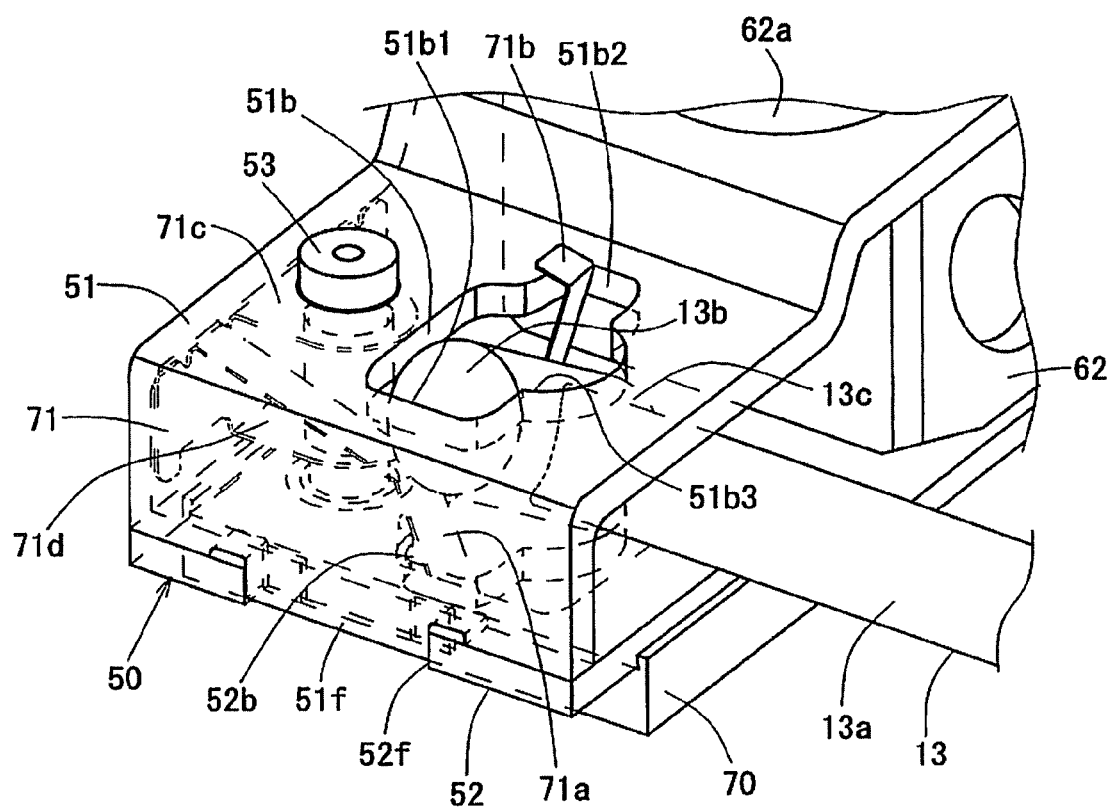
FIG. 20 is a perspective view corresponding to FIG. 3 and illustrating a process of rotating the cable end pin, illustrated in FIG. 19, in a positive direction by substantially 90 degrees with its shaft portion as an axis.
Figure 21:
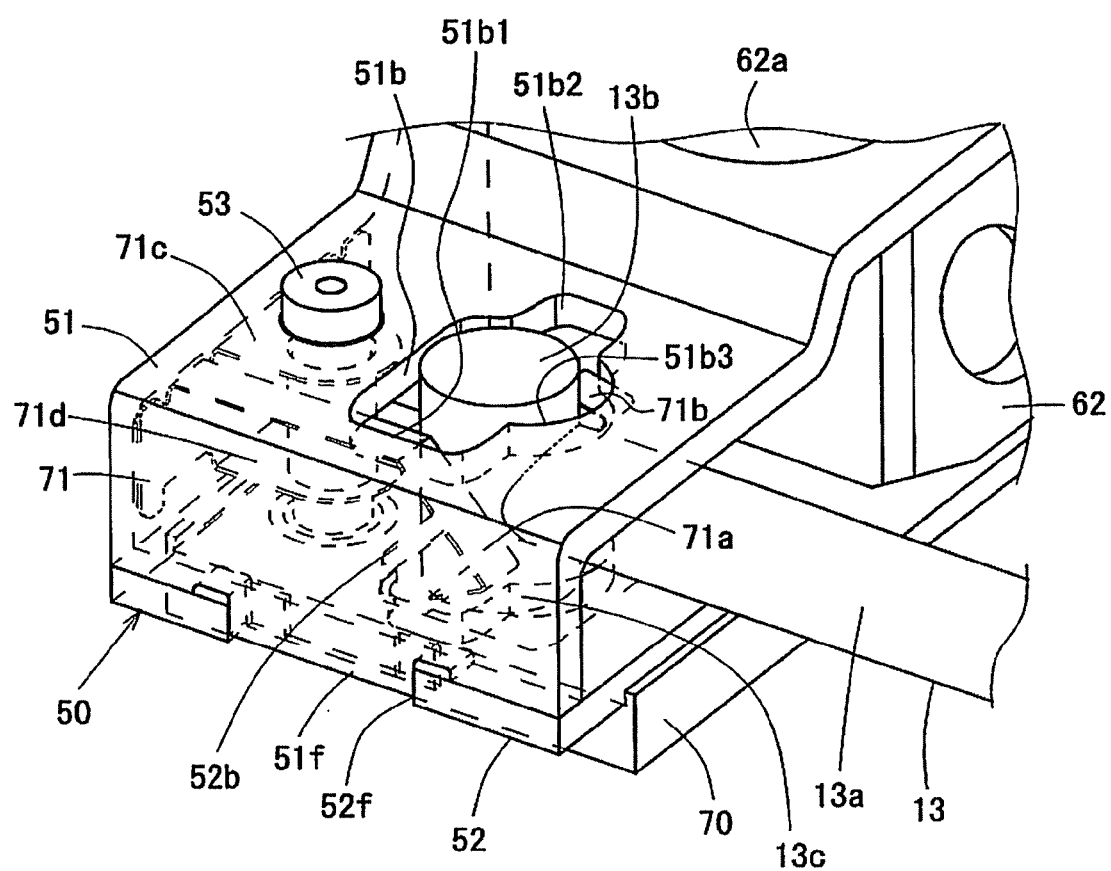
FIG. 21 is a perspective view corresponding to FIG. 3 and illustrating a state where the cable end pin, illustrated in FIG. 20, is rotated in the positive direction by substantially 90 degrees with its shaft portion as the axis.
Figure 22:
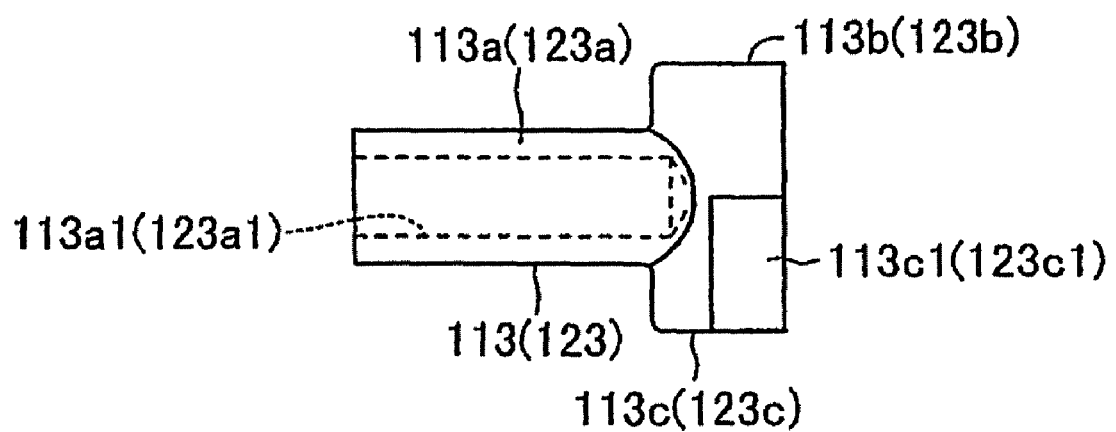
FIG. 22 is a front view of a cable end pin for inspection.
Figure 23:
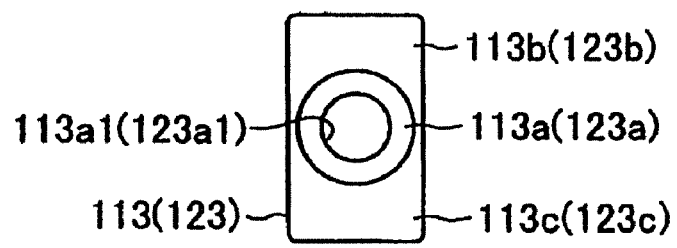
FIG. 23 is a side view of a left side of the cable end pin for inspection illustrated in FIG. 22.
Figure 24:
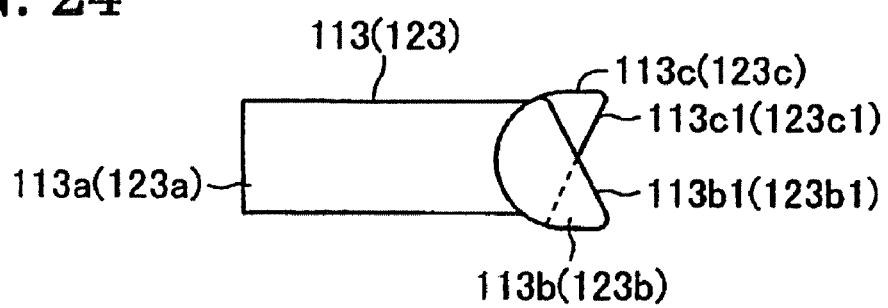
FIG. 24 is a plan view illustrating the cable end pin for inspection illustrated in FIG. 22.
Figure 25:
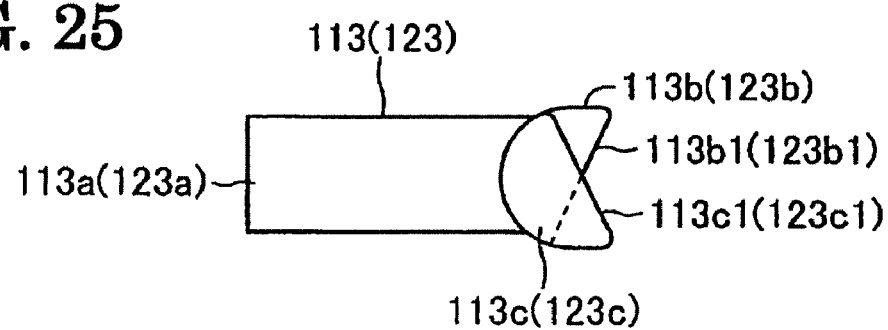
FIG. 25 is a bottom view illustrating the cable end pin for inspection illustrated in FIG. 22.
Figure 26:
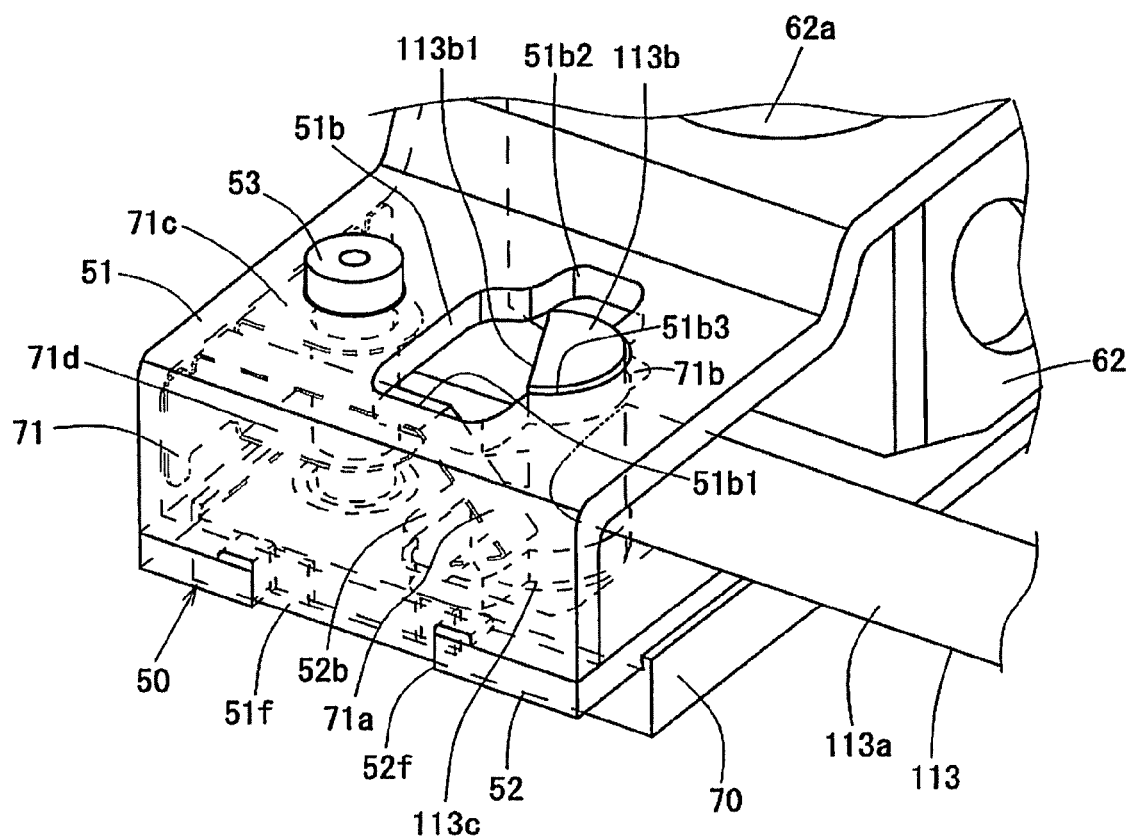
FIG. 26 is a perspective view corresponding to FIG. 3 and illustrating a state where the cable end pin for inspection, illustrated in FIG. 22, is attached at the equalizer.
Figure 27:
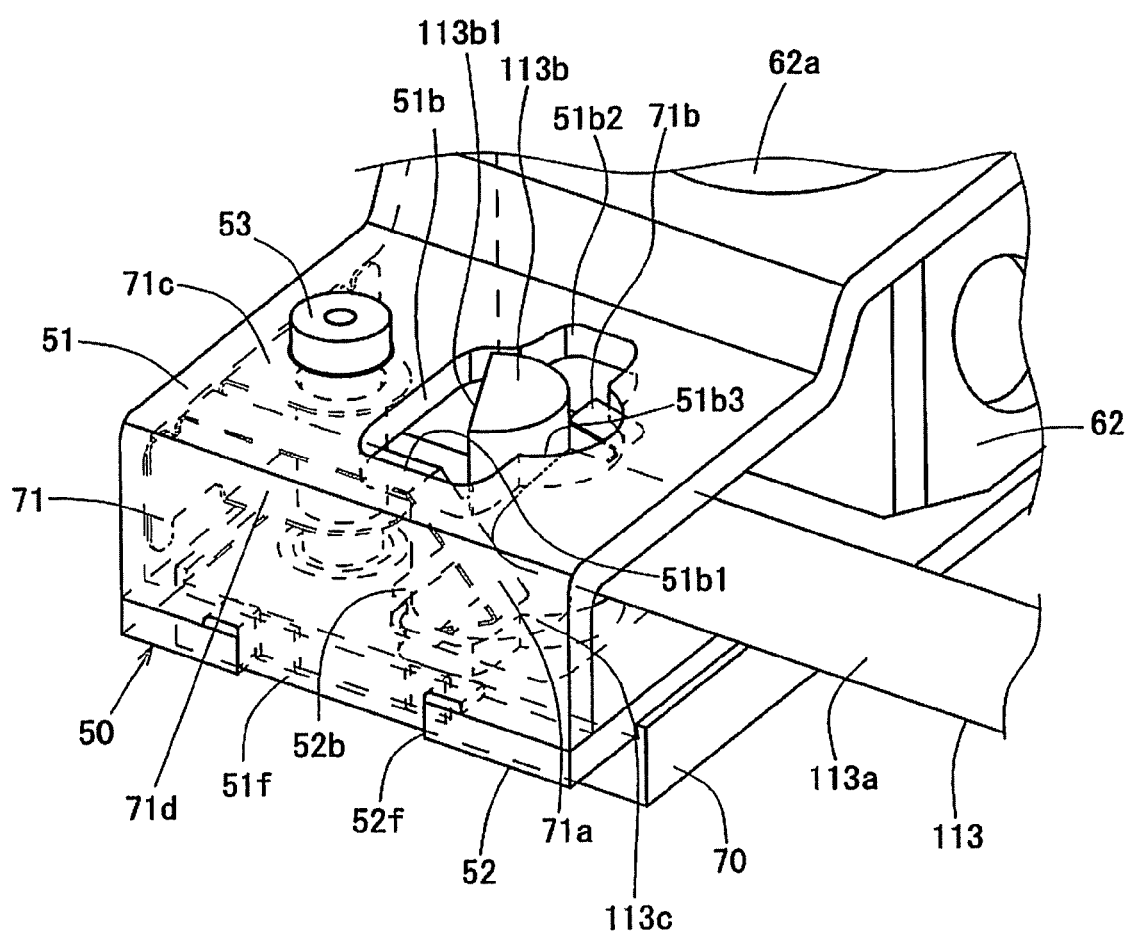
FIG. 27 is a perspective view corresponding to FIG. 3 and illustrating a process of rotating the cable end pin for inspection, illustrated in FIG. 26, in an inverse direction by substantially 90 degrees with its shaft portion as the axis.
Figure 28:
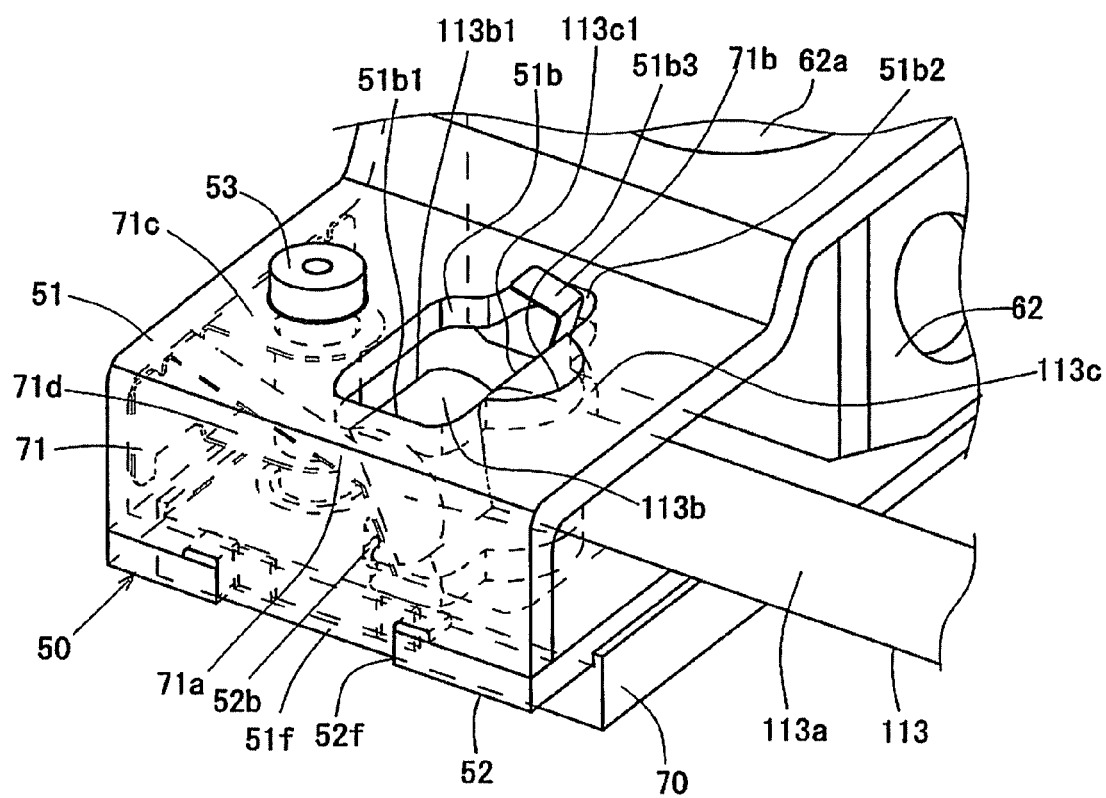
FIG. 28 is a perspective view corresponding to FIG. 3 and illustrating a state where the cable end pin for inspection, illustrated in FIG. 27, is rotated in the inverse direction by substantially 90 degrees with its shaft as the axis.
Figure 29:
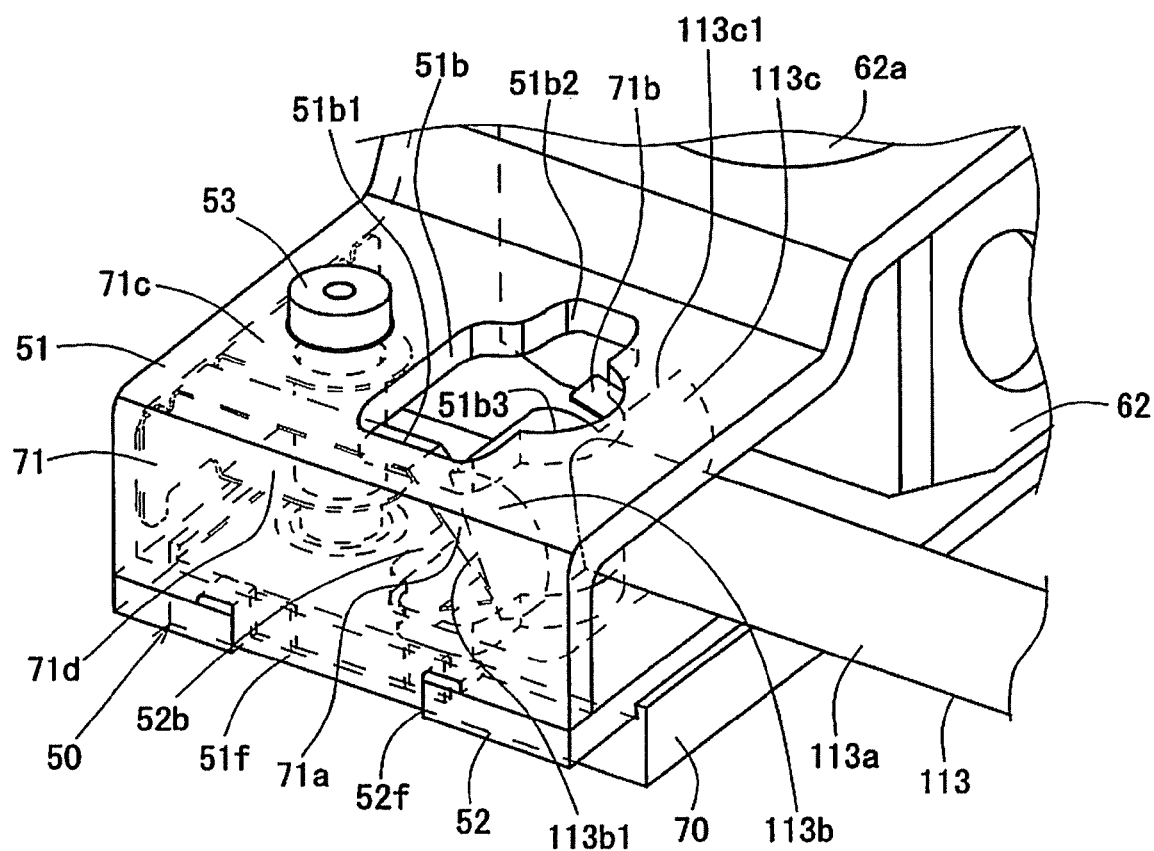
FIG. 29 is a perspective view corresponding to FIG. 3 and illustrating a process of detaching the arm portions of the cable end pin for inspection, illustrated in FIG. 28, from the respective pair of the end pin attachment holes of the equalizer.
Figure 30:
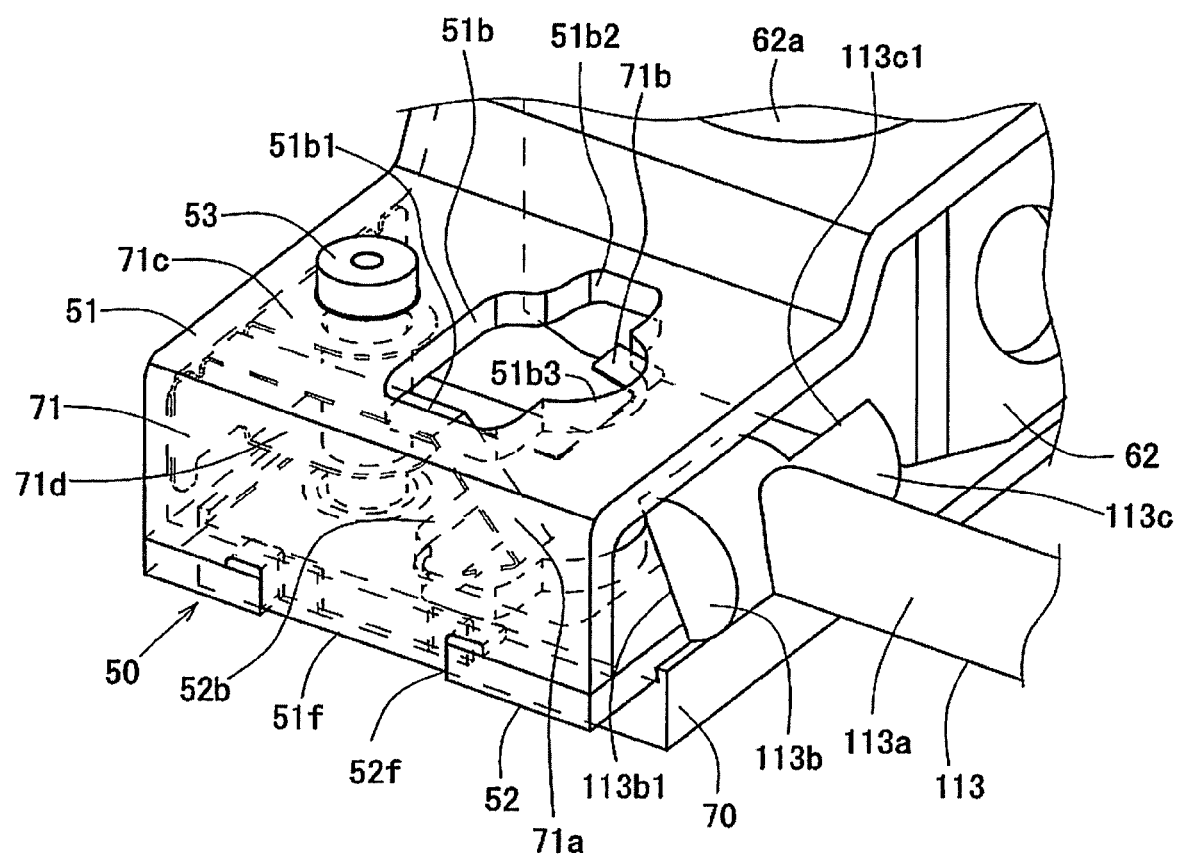
FIG. 30 is a perspective view corresponding to FIG. 3 and illustrating a state where the arm portions of the cable end pin for inspection, illustrated in FIG. 29, are detached from the respective pair of the end pin attachment holes of the equalizer.

Additionally, in the first embodiment, each of the cable end pins 13 and 23 is detachable from the housing 30 in a manner where: firstly, each of the cable end pins 13 and 23 is slightly pushed into the housing 30 by using a specific tool and the like from the outside of the housing 30 in a state where each of the end caps 14 and 24, which are attached to each of the first end portions 12a and 22a of the respective outer tubes 12 and 22, is detached from each of the outer tube attachment portions 31b and 31c (i.e. in a state where the outer tubes 12 and 22 are detached from the housing 30); secondly, each of the cable end pins 13 and 23 is rotated by substantially 90 degrees in the inverse direction (see FIGS. 21, 20 and 19); and then, each of the cable end pins 13 and 23 is pulled (see FIG. 18). Accordingly, attachment and detachment (disassembling/reassembling) of the end portion of each of the cables 10 and 20 at the side of the housing 30 is achievable only by attaching/detaching the relating components without disassembling the housing 30. Hence, servability in the market is enhanced.

In the above-described first embodiment, the case where the cable end pin 13 (23) illustrated in FIGS. 13 and 14 is adapted to the cable-type driving force transmission mechanism is described. However, as is in an alternative embodiment illustrated in FIGS. 22 to 30, a cable end pin 113 (123) for inspection, which is illustrated in FIGS. 22 to 25, may be temporarily adapted to the cable-type driving force transmission mechanism when a completed product of the electric actuator EA1 is inspected. The cable end pin 113 (123) includes cut-out portions 113b1 and 113c1 (123b1 and 123c1) at respective arm portions 113b and 113c (123b and 123c) (the first and second arm portions).

Each of the cut-out portions 113b1 and 113c1 (123b1 and 123c1) is formed so as to incline by substantially the same level as, and in the same direction as an inclination of each of the engagement pieces 71a and 71b (72a and 72b) of the first plate spring 71 (72). Accordingly, elastic deformation of each of the engagement pieces 71a and 71b (72a and 72b) of the first plate spring 71 (72) is reduced when the cable end pin 113 (123) is attached to and detached from the output portion 50A (50B) of the equalizer 50 (see FIGS. 26 to 30). Additionally, a structure of the cable end pin 113 (123) is substantially the same as the structure of the cable end pin 13 (23) of the first embodiment, except for the cut-out portions. Therefore, components and parts of the cable end pin 113 (123), which are substantially the same as the components and parts of the cable end pin 13 (23), are denoted by reference numerals in 100s, and the detailed explanation of substantially the same components and parts will be omitted.

In a case where the cable end pin 113 (123) illustrated in FIGS. 22 to 25 is adapted to the cable-type driving force transmission mechanisms, instead of the cable end pin 13 (23) illustrated in FIGS. 13 and 14, the cable end pin 113 (123) is easily attached to the output portion 50A (50B) of the equalizer 50, comparing to the case where the cable end pin 13 (23) is attached to the output portion 50A (50B) of the equalizer 50. Further, in this case, the cable end pin 113 (123) is easily detached from the output portion 50A (50B) of the equalizer 50, comparing to the case where the cable end pin 13 (23) is detached from the output portion 50A (50B) of the equalizer 50. Accordingly, the productivity of the electric actuator EA1 is enhanced by using the cable end pin 113 (123) as an inspection part when the completed product of the electric actuator EA1, to which each component is assembled within the housing 30, is inspected.

Further, in the first embodiment and in the alternative embodiment, the positive rotational direction when the cable end pin 13 (23) is attached to the output potion 50A (50B) of the equalizer 50 is set so as to correspond to a clockwise direction with reference to the cable end pin 13 (23) viewed from the inner wire 11 (21). Hence, the positive rotational direction of when the cable end pin 13 (23) is attached to the output portion 50A (50B) of the equalizer 50 is in the same direction as a rotational direction of when a general screw is screwed. Accordingly, the cable 10 (20) is smoothly assembled to the electric actuator EA1. Additionally, in a case when a rotational force is applied to the cable end pin 13 (23) because of, for example, a cable routing (cable arrangement) and the like, when the tension of the inner wire 11 (21) is relaxed in order to release the parking brake, the above-described positive rotational direction may be set to a direction to which the cable end pin rotates when the parking brake is released. In this case, the cable end pin 13 (23) tends to rotate in the positive direction even if tensile force of the inner wire 11 (21) is relaxed when the parking brake is released, and then the arm portions 13b and 13c (23b and 23c) are disengaged from the accommodation-and-retention portions 51b3 and 52b3 (51c3 and 52c3) of the end pin attachment holes 51b and 52b (51c and 52c), respectively, so that the arm portions 13b and 13c (23b and 23c) reach the rotation allowing hole portions 51b1 and 52b1 (51c1 and 52b2), respectively. Therefore, the reliability of the connected portions is enhanced.

[Second Embodiment]

A second embodiment in which the cable-type driving force transmission mechanism is adapted to the electric parking brake apparatus for a vehicle is illustrated in FIGS. 31 to 44. In the second embodiment, as illustrated in FIG. 31, a cable 210 is provided between an electric actuator EA2, which is attached to the vehicle body, and a parking brake apparatus PBa, and a cable 220 is provided between the electric actuator EA2 and a parking brake apparatus PBb, so that a driving force of the electric actuator EA2 is transmitted to each of the parking brake apparatuses PBa and PBb via each of the cables 210 and 220.

The electric actuator EA2 includes a housing 230 attached to the vehicle body, an electric motor EM2, which is attached to a housing main body 231 of the housing 230 via a housing side member 232, a speed reduction mechanism A2, which is provided within an accommodation portion formed by the housing main body 231 and the housing side member 232 and which reduces and transmits a rotational driving force, which is an output of the electric motor EM2, a conversion mechanism B2, which is provided within an accommodation portion formed by the housing main body 231 and a housing upper member (i.e. within the housing 230) and which converts the rotational driving force of the electric motor EM2 transmitted via the speed reduction mechanism A2 into a linear driving force, and an equalizer 250, which is driven by the liner driving force, generated by converting the rotational driving force of the electric motor EM2 by the conversion mechanism B2, and which distributes the linear driving force to output portions 250A and 250B.

Figure 31:
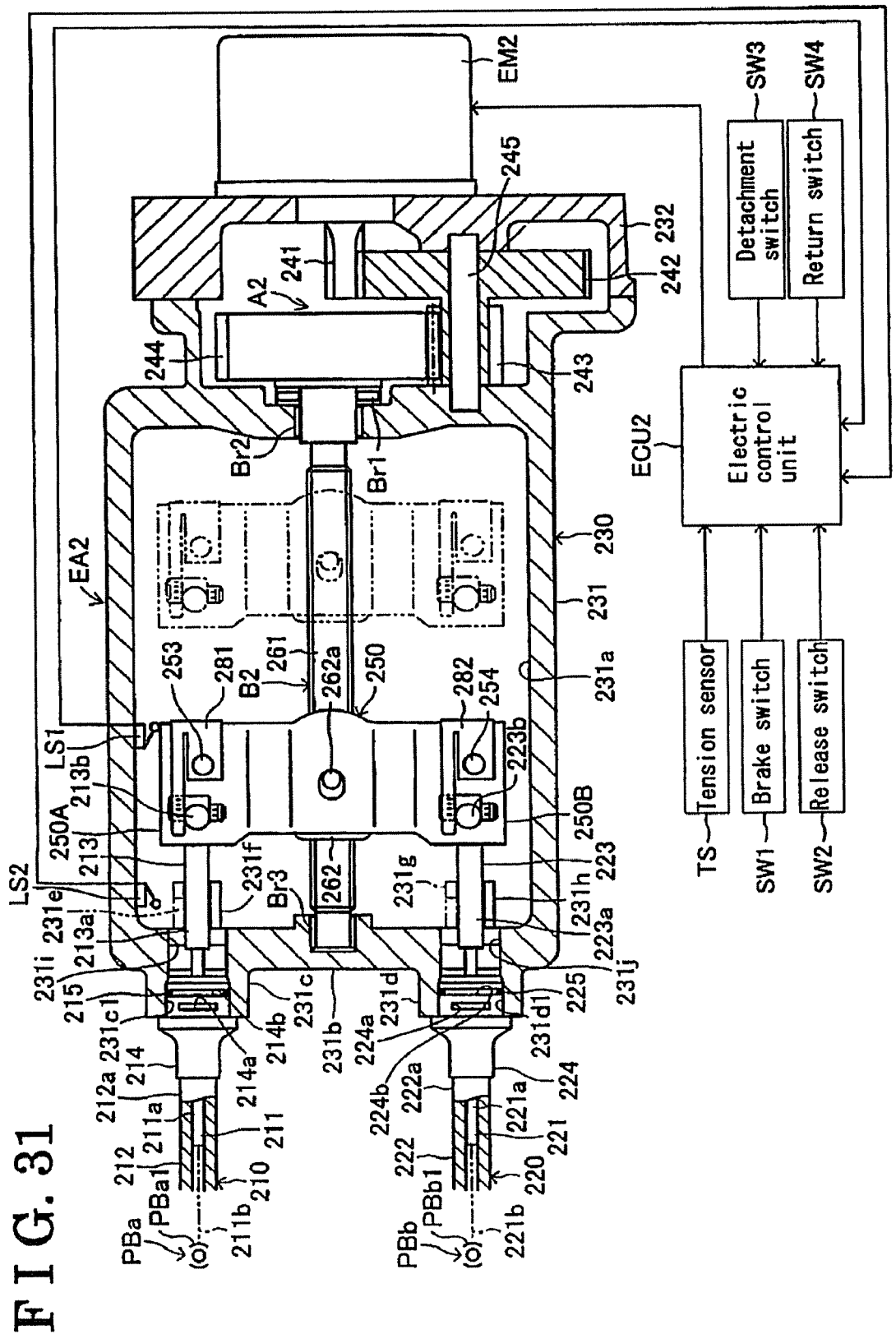
FIG. 31 is a partial cross-sectional plan view schematically illustrating a second embodiment in which the cable-type driving force transmission mechanism is adapted to the electric parking brake apparatus for the vehicle.

In the housing 230 illustrated in FIG. 31, an opening 231a is provided at an upper portion of the housing main body 231, so that each component such as the conversion mechanism B2, the equalizer 250 and the like is assembled within the housing 230 or detached therefrom for exchange via the opening 231a. The housing 230 is formed with the housing main body 231, the housing side member 232 and the housing upper member. The housing side member 232 and the housing upper member 2 are detachably attached to the housing main body 231 so as to fluid-tightly seal an inner space of the housing 30. The opening 231 a of the housing main body 231 is sealable by the housing upper member.

As illustrated in FIG. 31, the housing main body 231 includes a wall portion 231b at a position closer to the each of the parking brake apparatuses PBa and PBb so that the wall portion 231b is positioned opposite from the electric actuator EA2 and extends in a direction orthogonal to a direction to which each of the cables 210 and 220 extends. Further, the housing main body 231 includes outer tube attachment portions 231c and 231d, which extend from the wall portion 231b towards the outside of the housing 230. The housing main body 231 includes a pair of pushing portions 231e and 231f, which extends towards inside of the housing 230 from the wall portion 231b at a side of the outer tube attachment portion 231c. Further, the housing main body 231 includes a pair of pushing portions 231g and 231h, which extend towards the inside of the housing 230 from the wall portion 231b at a side of the outer tube attachment portion 231d.

The wall portion 231b includes a pair of insertion holes 231i and 231j, so that the cable end pins 213 and 223 of the respective inner wires 211 and 221 of the respective cables 210 and 220 are insertable into the insertion holes 231i and 231j, respectively. As illustrated in, for example, FIG. 32, the insertion hole 231i is in communication with the inside of the housing 230 at an inner end portion of the insertion hole 231i and is in communication with an insertion hole 231c1, which is formed at the outer tube attachment portion 231c and which is formed in a cylindrical shape, at an outer end portion of the insertion hole 231i. Similarly, the insertion hole 231j is in communication with the inside of the housing 230 at an inner end portion of the insertion hole 231j and is in communication with an insertion hole 231d1, which is formed at the outer tube attachment portion 231d and which is formed in a cylindrical shape, at an outer end portion of the insertion hole 231j. Further, each of the insertion holes 231i and 231j includes a bore portion and a hole portion. The bore portion is formed in a substantially rectangular shape whose lateral length, which extends in the same direction as the wall portion 231b extends, is longer than a vertical length and communicates with the inside of the housing 230. The hole portion communicates with the bore portion at an inner end portion of the hole portion and communicates with each of the insertion holes 231c1 and 231d1 of the respective outer tube attachment portions 231c and 231d at an outer end portion of the hole portion. Further, the hole portion includes an inclined surface at each of an upper and lower inner end portion thereof so that the hole narrows towards the inner end portion of the hole portion.

Accordingly, as illustrated in FIGS. 38 to 41, in a case where each of the cable end pins 213 and 223 is inserted into the housing 230 from the outside thereof via each of the insertion holes 231c1 and 231d1 of the respective outer tube attachment portions 231c and 231d, and via each of the insertion holes 231i and 231j of the wall portion 231b, each of the cable end pins 213 and 223 is turned so that each pair of arm portions 213b and 213c of the cable end pin 213 and the arm portions 223b and 223c of the cable end pin 223 turn in a horizontal position (i.e. in a state where each pair of the arm portions 213b and 213c of the cable end pin 213 and the arm portions 223b and 223c of the cable end pin 223 is inserted between an upper surface portion 251 and a lower surface portion 252 of the equalizer 50) in each of the insertion holes 231i and 231j of the wall portion 231b.

The outer tube attachment portions 231c and 231d include the above-mentioned insertion holes 231c1 and 231d1 formed in the cylindrical shape, respectively, so that casing caps 214 and 224 of the respective outer tubes 212 and 222 of the respective cables 210 and 220 are attachable to and detachable from the insertion holes 231c1 and 231d1, respectively. Further, a slit for attaching thereat a clip for retaining each of the casing caps 214 and 224 (i.e. a clip whose portion is engageable with each of slits 214a and 224a formed at the respective casing caps 214 and 224) is provided at each of the outer tube attachment portions 231c and 231d.

Figure 32:
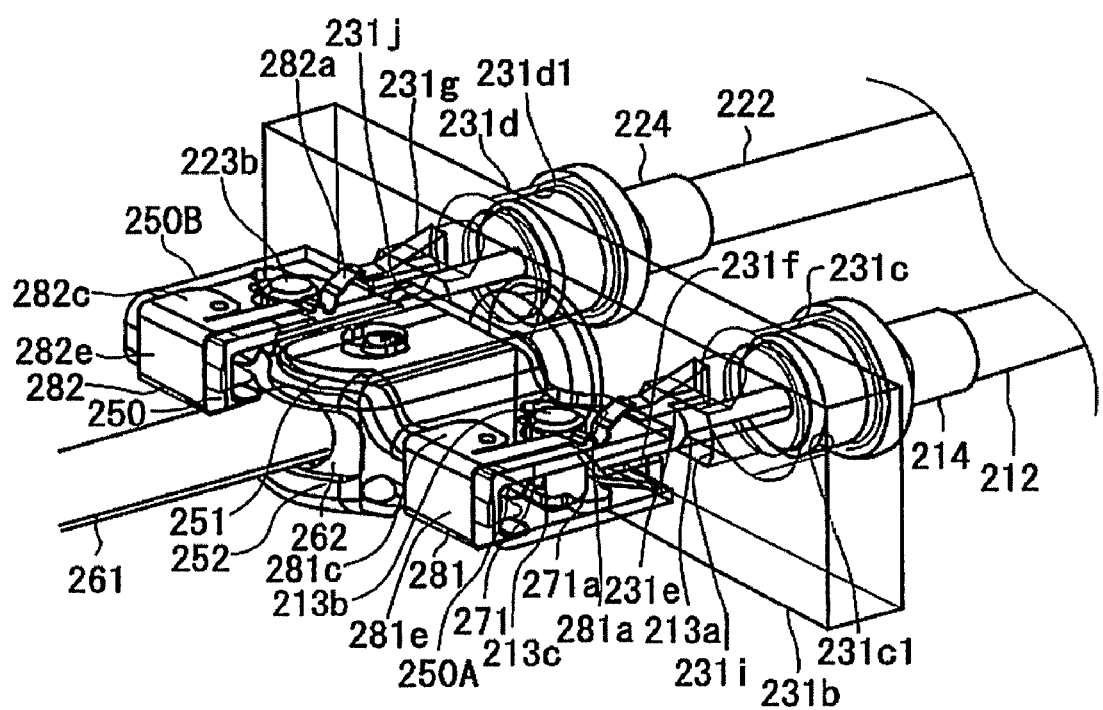
FIG. 32 is a perspective view illustrating a relationship between a cable, a housing, a cable end pin, a casing cap, a first plate spring, a second plate spring, an equalizer and the like illustrated in FIG. 31.

As illustrated in FIGS. 31 and 32, the pushing portion 231e is formed in a nail shape and includes an inclined surface for disengaging an engagement piece 281a of a second plate spring 281, which is attached at the output portion 250A of the equalizer 250, from a rotation allowing hole portion 251b1 of the equalizer 250. Similarly, the pushing portion 231f is formed in a nail shape and includes an inclined surface for disengaging an engagement piece 281b of the second plate spring 281, which is attached at the output portion 250A of the equalizer 250, from a rotation allowing hole portion 252b1 of the equalizer 250A. Further, the pushing portions 231e and 231f are arranged so as to be symmetrical with respect to a center point of the insertion hole 231i. The pushing portion 231g is formed in a nail shape and includes an inclined surface for disengaging an engagement piece 282a of a second plate spring 282, which is attached at the output portion 250B of the equalizer 250, from a rotation allowing hole portion 251c1 of the equalizer 250. Similarly, the pushing portion 231h is formed in a nail shape and includes an inclined surface for disengaging an engagement piece 282b of the second plate spring 282 from a rotation allowing hole portion 252c1 of the equalizer 250. Further, the pushing portions 231g and 231h are arranged so as to be symmetrical with respect to a center point of the insertion hole 231j.

The electric actuator EA2 includes the tension sensor TS, which detects a tensile force acting on each of the inner wires 211 and 221 of the respective cables 210 and 220 and which outputs an electrical signal to an electric control unit ECU2. Further, the electric actuator EA2 includes operation switches such as the brake switch SW1, the release switch SW2, a detachment switch SW3, a return switch SW4 and the like, and position detection switches such as a release position limit switch LS1, a detachment position limit switch LS2 and the like.

The electric motor EM2 is attached to the housing side member 232 that is attached to one side of the housing main body 231, so that an operation of the electric motor EM2 is controlled by the electric control unit ECU2. The electric motor EM2 is rotatably driven in the positive direction by the driver operating the brake switch SW1, and is rotatably driven in the inverse direction (i.e. a direction opposite from the positive direction) by the driver operating the release switch SW2.

Further, the electric motor EM2 is configured so as to be driven in the inverse direction by the driver operating the detachment switch SW3 while the detachment position limit switch LS2 is OFF and so that the electric motor EM2 is stopped being rotatably driven in the inverse direction when the detachment position limit switch LS2 is turned ON. On the other hand, the electric motor EM2 is configured so as to be driven in the positive direction by the driver operating the return switch SW4 while the release position limit switch LS1 is OFF and so that the electric motor EM2 is stopped being rotatably driven in the positive direction when the release position limit switch LS1 is turned ON.

As illustrated in FIG. 31, the release position limit switch LS1 is provided within the housing main body 231, so that the release position limit switch LS1 contacts the equalizer 250 when the equalizer 250 is positioned at a release position (a position illustrated by a solid line in FIG. 31) and then outputs an electric signal indicating that the release position limit switch LS1 is ON to the electric control unit ECU2. Further, the release position limit switch LS1 is turned to be in a non-contact state relative to the equalizer 250 when the equalizer 250 is moved for a predetermined amount from the release position towards a wire detachment position (i.e. when the equalizer 250 is moved towards the left side in FIG. 1 from the position indicated by the solid line for a predetermined amount) and then outputs an electric signal indicating that the release position limit switch LS1 is OFF to the electric control unit ECU2.

As illustrated in FIG. 31, the detachment position limit switch LS2 is provided within the housing main body 231, so that the detachment position limit switch LS2 contacts the equalizer 250 when the equalizer 250 is positioned at the wire detachment position and then outputs an electric signal indicating that the detachment position limit switch LS2 is ON to the electric control unit ECU2. Further, the detachment position limit switch LS2 turned to be in a non-contact state relative to the equalizer 250 when the equalizer 250 is moved for a predetermined amount from the wire detachment position towards the release position and then outputs an electric signal indicating that the detachment position limit switch LS2 is OFF to the electric control unit ECU2.

The speed reduction mechanism A2 is provided within the accommodation portion formed between the housing main body 231 and the housing side member 232. The speed reduction mechanism A2 includes an input small gear 241, which is attached to an output shaft of the electric motor EM2 and is integrally rotated with the output shaft of the electric motor EM2, and an output large gear 244, which is attached at an end portion of a screw shaft 261 and is integrally rotated with the screw shaft 261. Further, the speed reduction mechanism A2 includes an intermediate large gear 242 and an intermediate small gear 243, which are rotatably provided between the housing main body 231 and the housing side member 232 via a support shaft 245. The intermediate large gear 242 is normally engaged with the input small gear 241. The intermediate small gear 243 is integrally rotatable with the intermediate large gear 242 and normally engages with the output large gear 244. Hence, the output of the electric motor EM2 is transmitted and reduced via the input small gear 241, the intermediate large gear 242, the intermediate small gear 243 and the output large gear 244. Additionally, the wordings "large" and "small" in describing the gears do not specify sizes of the gears, but the words "large" and "small" are used simply because the output gear 244 is larger than the input gear 241 in this embodiment.

The conversion mechanism B2 is configured with the screw shaft 261 as an input element and a nut 262 as an output element. The nut 262 is screwed and attached on the screw shaft 261. As a structure of the screw shaft 261 is substantially the same as the structure of the screw shaft 61 of the first embodiment. Therefore, components and the parts of the screw shaft 261, which correspond to the components and parts of the screw shaft 61, are denoted by like reference numerals, and the detailed explanation of the screw shaft 261 is omitted. Further, a structure of the nut 262 is substantially the same as the structure of the nut 62 of the first embodiment. Therefore, components and parts of the screw shaft 261, which correspond to the components and parts of the screw shaft 61, are denoted by like reference numerals in 200s, and the detailed explanation of substantially the same components and parts will be omitted.

In the conversion mechanism B2, when the screw shaft 261 is rotatably driven in the positive direction while the nut 262 is positioned at a release position the nut 262 at the left side of FIG. 31 (a position illustrated by a solid line), the nut 262 is moved in an axial direction of the screw shaft 261 from the release position at the left side of FIG. 31 (the position illustrated by the solid line in FIG. 31) towards an actuation position at the right side of FIG. 31 (a position illustrated by a chain double-dashed line in FIG. 31). Further, in the conversion mechanism B2, when the screw shaft 261 is rotatably driven in the inverse direction while the nut 262 is positioned at the actuation position at the right side of FIG. 31 (the position illustrated by the chain double-dashed line in FIG. 31), the nut 262 is moved in the axial direction of the screw shaft 261 towards the release position at the left side of FIG. 31 from the actuation position at the right side of FIG. 31.

Figure 38:
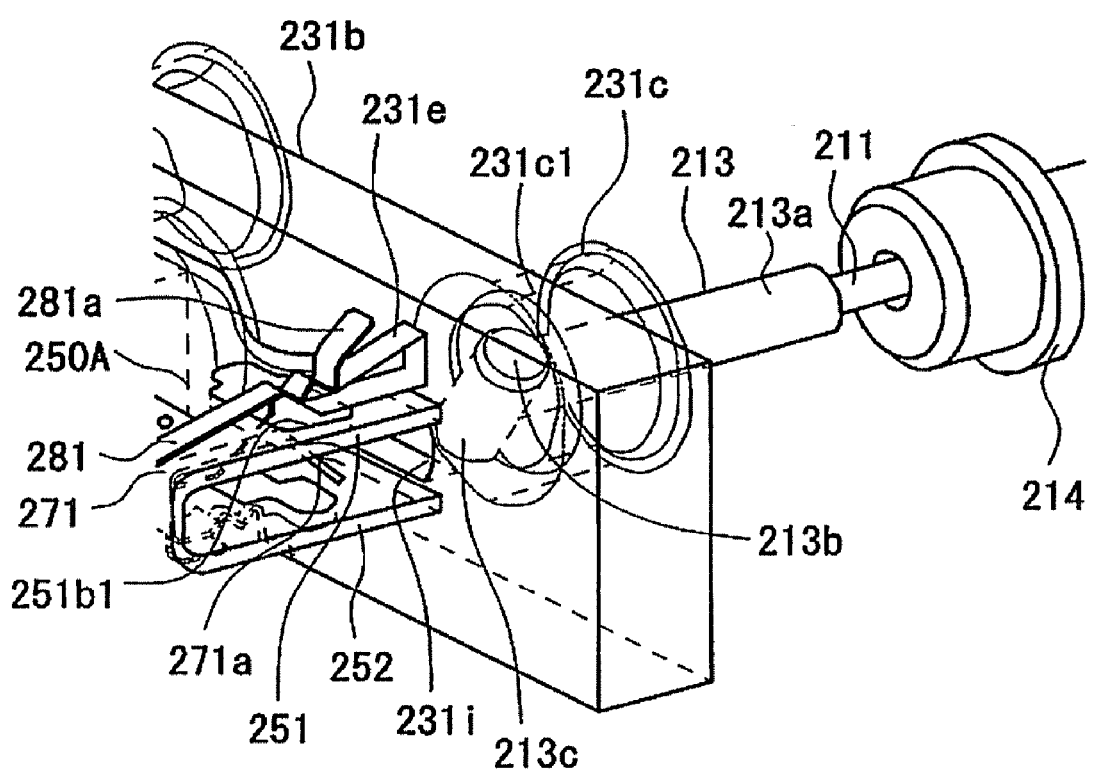
FIG. 38 is a perspective view corresponding to FIG. 32 and illustrating an early stage of a process of attaching the inner wire, illustrated in FIG. 32, to the equalizer.

Furthermore, in the conversion mechanism B2, when the screw shaft 261 is rotatably driven in the inverse direction while the nut 262 is positioned at the release position in FIG. 31 (the position indicated by the solid line), the nut 262 is moved in the axial direction of the screw shaft 261 from the release position in FIG. 31 (the position indicated by the solid line) towards the wire detachment position (see FIG. 38). On the other hand, when the screw shaft 261 is rotatably driven in the positive direction while the nut 262 is positioned at the wire detachment position, the nut 262 is moved in the axial direction of the screw shaft 261 from the wire detachment position towards the release position (the position indicated by the solid line in FIG. 31).

The equalizer 250 (a driving member) equally distributes the linear driving force acting on the nut 262 to the output portions 250A and 250B. The equalizer 250 is attached to the nut 262 at a center portion of the equalizer 250 so as to be swingable for a set amount in order to balance between the output portions 250A and 250B. Further, the equalizer 250 is connected to a first end portion 211a of the inner wire 211 of the cable 210 at the output portion 250A via the cable end pin 213. The equalizer 250 is connected to a first end portion 221a of the inner wire 221 of the cable 220 at the output portion 250B via the cable end pin 223.

Figure 35:
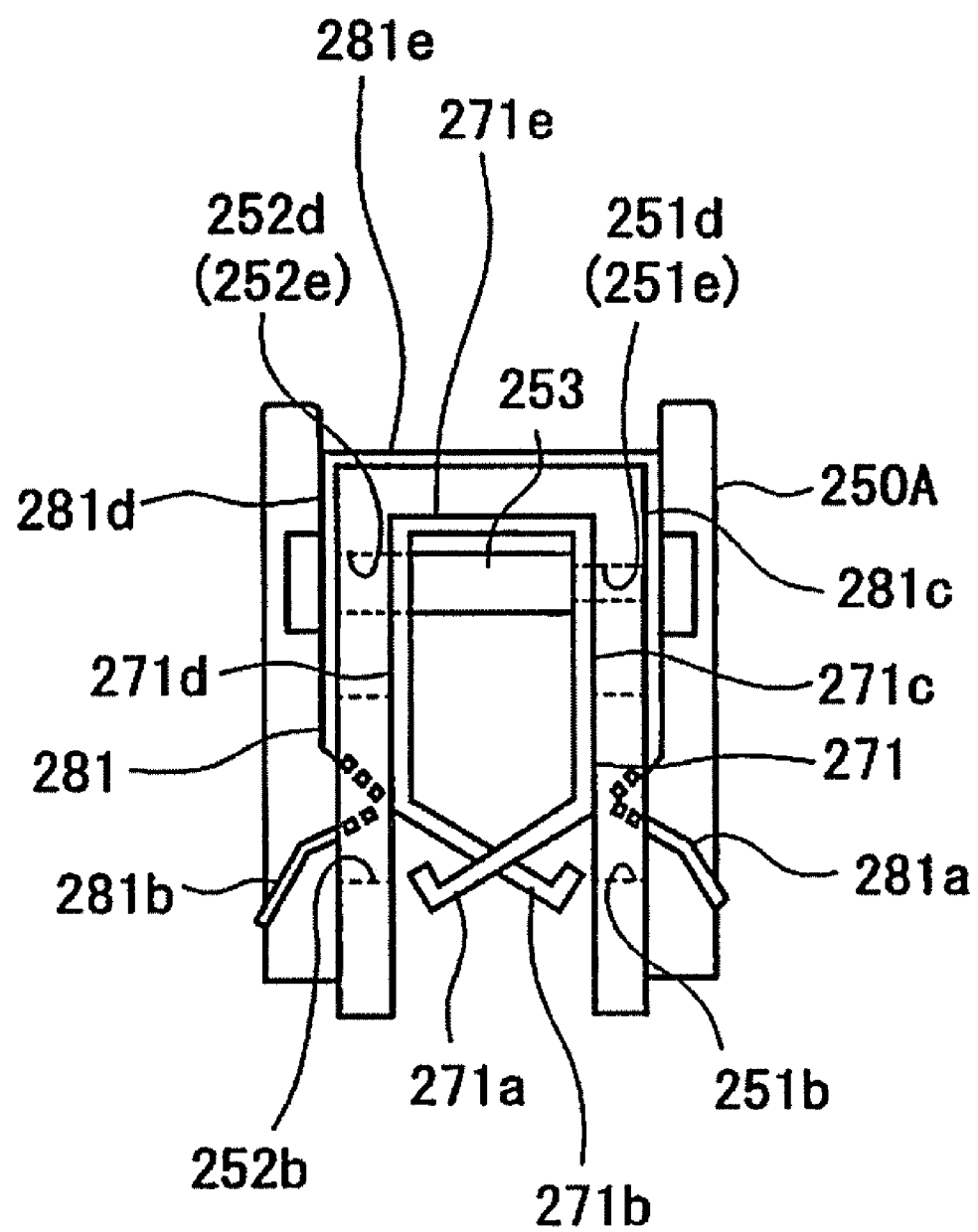
FIG. 35 is a side view illustrating the relationship, viewed from the left side, between the equalizer, the first plate spring, the second plate spring and the connecting pin, which are illustrated in FIG. 33.

As illustrated in FIGS. 32 and 35, the equalizer 250 is formed by bending a plate in a U-shape, so that the equalizer 250 includes the upper surface portion 251, formed in substantially rectangular shape, and the lower surface portion 252, formed in substantially rectangular shape. Further, a first plate spring 271 and a second plate spring 281 are attached at the equalizer 250 by means of a connecting pin 253. A first plate spring 272 and a second plate spring 282 are attached at the equalizer 250 by means of a connecting pin 254.

Figure 33:
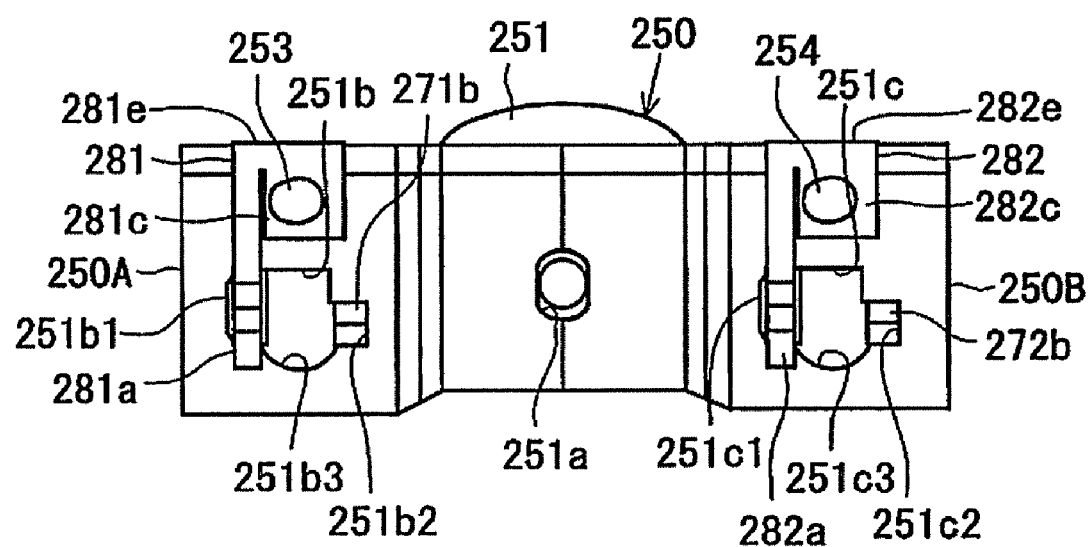
FIG. 33 is a front view illustrating a relationship between the equalizer, the first plate spring, the second plate spring and a connecting pin, which are illustrated in FIG. 31.
Figure 34:
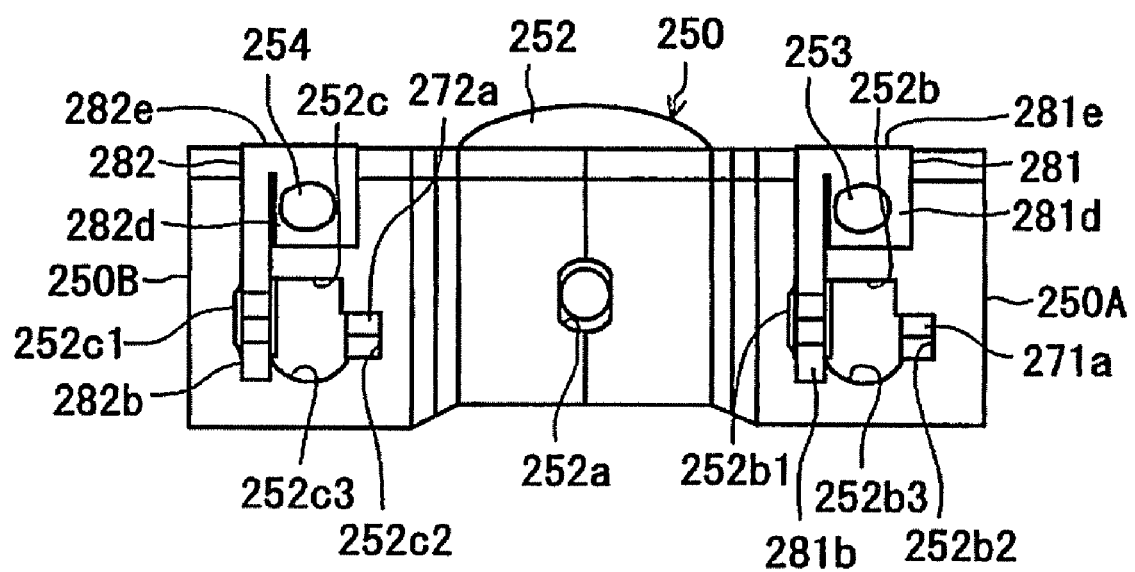
FIG. 34 is a rear view illustrating the relationship between the equalizer, the first plate spring, the second plate spring and the connecting pin, which are illustrated in FIG. 33.

As illustrated in FIG. 33 and as is the case with the upper member 51 of the first embodiment, a connecting pin insertion hole 251a is formed at a center portion of the upper surface portion 251. Further, the upper surface portion 251 includes a pair of end pin attachment holes 251b and 251c at end portions of the upper surface portion 251 in a longitudinal direction thereof (i.e. at left end portion and right end portion of the upper surface portion 251 in FIG. 33), respectively. The upper surface portion 251 further includes a pair of mating pin attachment holes 251d and 251e (see FIG. 35) at the end portions of the upper surface portion 251 in the longitudinal direction thereof, respectively. As illustrated in FIG. 34, as is the case with the lower member 52 of the first embodiment, a connecting pin insertion hole 252a is formed at a center portion of the lower surface portion 252. Further, the lower surface portion 252 includes a pair of end pin attachment holes 252b and 252c at end portions of the lower surface portion 252 in a longitudinal direction thereof (i.e. at right end portion and left end portion of the lower surface portion 252 in FIG. 34), respectively. The lower surface portion 252 further includes a pair of mating pin attachment holes 252d and 252e (see FIG. 35) at the end portions of the lower surface portion 252 in the longitudinal direction thereof, respectively. Detailed structures of the end pin attachment holes 251b and 251c are substantially the same as the structures of the end pin attachment holes 51b and 51c of the first embodiment. Further, structures of the end pin attachment holes 252b and 252c are substantially the same as the structures of the end pin attachment holes 52b and 52c of the first embodiment. Therefore, components and parts of the end pin attachment holes 251b and 251c of the upper surface portion 251 and the end pin attachment holes 242b and 252c of the lower surface portion 252, which correspond to the components and parts of the end pin attachment hole 51b and 51c of the upper member 51 and the end pin attachment hole 52b and 52c of the lower member 52, respectively, are denoted by like reference numerals in 200s, and the detailed explanation of substantially the same components and parts will be omitted.

As illustrated in FIG. 31, the cable 210 includes the inner wire 211 and the outer tube 212. The inner wire 211 is detachably connected to the output portion 250A of the equalizer 250 at the first end portion 211a via the cable end pin 213. Further, the inner wire 211 is detachably connected to the actuation member PBa1 of the parking brake apparatus PBa at a second end portion 211b of the inner wire 211.

As illustrated in FIG. 31, the cable 220 includes the inner wire 221 and the outer tube 222. The inner wire 221 is detachably connected to the output portion 250B of the equalizer 250 at the first end portion 221a via the cable end pin 223. Further, the inner wire 221 is detachably connected to the actuation member PBb1 of the parking brake apparatus PBb at a second end portion 221b of the inner wire 221.

As illustrated in FIG. 31, the outer tube 212 (222) covers an outer circumference of the inner wire 211 (221) except for both end portions thereof. The outer tube 212 (222) is configured so as to be detachably and immovably attached to the outer tube attachment portion 231c (231d), which is provided at the housing 230, at a first end portion 212a (222a), which is positioned at the housing side, via a casing cap 214 (224). Further, the outer tube 212 (222) is detachably and immovably attached to a retaining member for retaining the actuation member PBa1 (PBb1) at a second end portion (i.e. an end portion positioned at the actuation member side) of the outer tube 212 (222).

Figure 36:
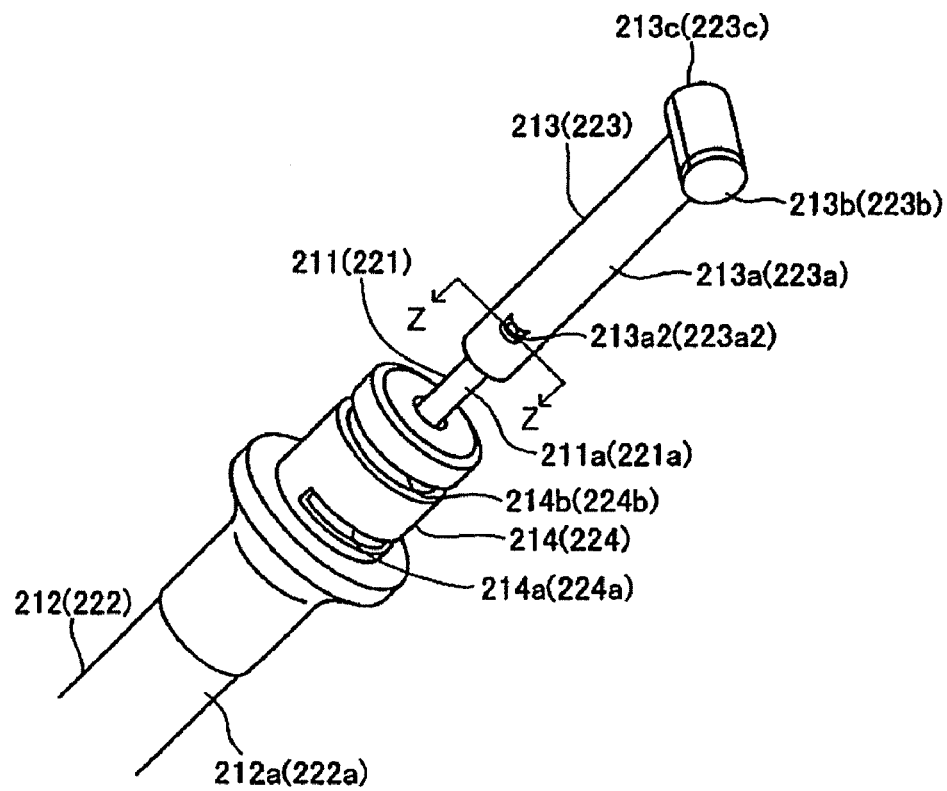
FIG. 36 is a perspective view illustrating a relationship between an inner wire, an outer tube, a cable end pin and a casing cap, which are illustrated in FIG. 31.

The cable end pins 213 and 223 are formed to have the same shape. Hence, the detailed description of the cable end pins 213 and 223 will be given with the cable end pin 213 as an example. Further, reference numerals of the corresponding parts of the cable end pin 223 will be indicated within brackets. As illustrated in FIG. 36, the cable end pin 213 (223) is formed in a T-shape. The cable end pin 213 (223) includes the shaft portion 213a (223a), which extends in a wire longitudinal direction and which is formed in a cylindrical shape, and a pair of the arm portions 213b and 213c (223b and 223c) (the first and second arm portions), which protrude from an end portion of the shaft portion 213a (223a) in a radial direction thereof for a predetermined amount and whose cross-sections are formed in a circle.

Figure 37:
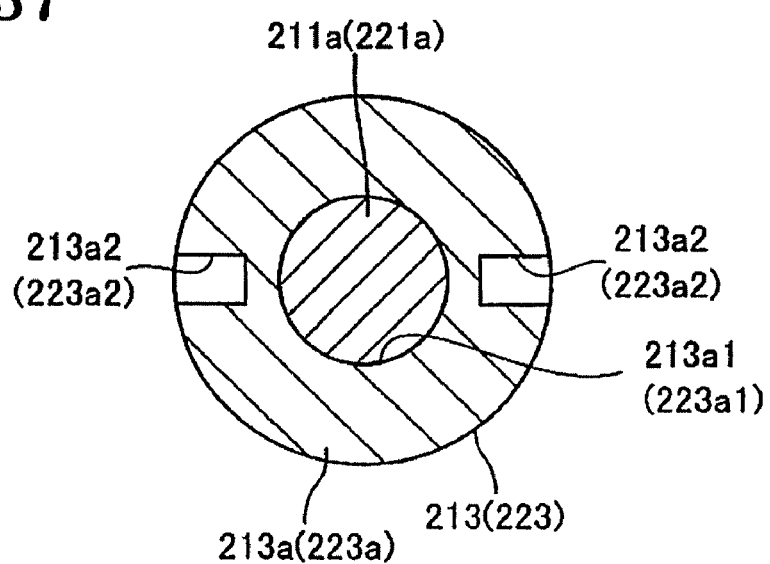
FIG. 37 is an enlarged longitudinal sectional view taken along line Z-Z in FIG. 36.

As illustrated in FIGS. 36 and 37, in the cable end pin 213 (223), the first end portion 211a (221a) of the inner wire 211 (221) is fixed at an attachment bore 213a1 (223a1), which is coaxially formed at the shaft portion 213a (223a), by means of a fixing means such as a weld (or, by calking) in a state where the first end portion 211a (221a) of the inner wire 211 (221) is fitted into the attachment bore 213a1 (223a1). As a result, the cable end pin 213 (223) is fixed at the first end portion 211a (221a) of the inner wire 211 (221). Further, the cable end pin 213 (223) is configured so as to be insertable into/removable from the housing main body 231 via the insertion hole 231c1 (231d1) of the outer tube attachment portion 231c (231d) of the housing main body 231 and via the insertion hole 231i (231j) of the wall portion 231b in a state where the cable end pin 213 (223) is fixed at the end portion 211a (221a) of the inner wire 211 (221).

Further, the cable end pin 213 (223) is movable in the axial direction relative to the casing cap 214 (224) and is contactable with an end portion of the casing cap 214 (224) at an end portion of the shaft portion 213a (223a). The shaft portion 213a (223a) of the cable end pin 213 (223) is configured so that a portion thereof protrudes towards the outside of the housing 230 when the equalizer 250 is positioned at the wire detachment position. Further, as illustrated in FIGS. 36 and 37, a pair of recessed portions 213a2 (223a2), which is retained by a specific tool and the like, is provided at the portion of the shaft portion 213a that is outwardly extendable from the housing 230 when the equalizer 250 is positioned at the wire detachment position.

The casing cap 214 (224) is inseparably attached to the first end portion 212a (222a) of the outer tube 212 (222). Further, the casing cap 214 (224) is detachably and immovably attached to the outer tube attachment portion 231c (231d) via the clip. As illustrated in FIGS. 31 and 36, the casing cap 214 (224) includes the slit 214a (224a), to which the clip is insertable, and an annular groove 214b (224b), to which an O-ring 215 (225) is attached.

The clip is removable from the outer tube attachment portion 23 1c (231d). Further, a portion of the clip is engageable with the slit 214a (224a) provided at the casing cap 214 (224) via the slit provided at the outer tube attachment portion 231c (231d). Accordingly, in a state where the clip is detached from the outer tube attachment portion 231c (231d) by an operation from the outside of the housing 230, the casing cap 214 (224), together with the outer tube 212 (222), is detachable relative to the outer tube attachment portion 231c (231d).

In the state where the casing cap 214 (224) is attached at the outer tube attachment portion 231c (231d), the movement of the equalizer 250 from the release position to the wire detachment position is restricted by the cable end pin 231 (223) contacting with the casing cap 214 (224), as illustrated in FIG. 32. On the other hand, in the state where the casing cap 214 (224) is detached from the outer tube attachment portion 231c (231d), the movement of the equalizer 250 from the release position to the wire detachment position is allowed because, as illustrated in FIGS. 38 to 43, a movement of the cable end pin 213 (223) is not restricted by the casing cap 214 (224).

Each of the first plate springs 271 and 272 is formed in substantially the same shape as each of the first plate sprigs 71 and 72 of the above-described first embodiment. As the first plate springs 271 and 272 are configured substantially the same, the detailed explanation of the first plate springs 271 and 272 will be given with the first plate spring 271 as an example. Additionally, reference numerals within the brackets indicate the corresponding portions and components of the first plate spring 272. As illustrated in FIGS. 33 to 35, the first plate spring 271 (272) includes a pair of engagement pieces 271a and 271b (272a and 272b) (the first and second engagement pieces) and a pair of attachment pieces 271c and 271d (272c and 272d). As is the case with the above-described first embodiment, the attachment pieces 271c and 271d (272c and 272d) are attached to the output portion 250A (250B) of the equalizer 250 via the connecting pin 253 (254).

Each of the second plate springs 281 and 282 is configured substantially the same, therefore, the detailed explanation of the second plate springs 281 and 282 will be given with the second plate spring 281 as an example. Additionally, reference numerals within the brackets indicate the corresponding portions and components of the second plate spring 282. As illustrated in FIGS. 32 to 35, the second plate spring 281 (282) includes a pair of the engagement pieces 281a and 281b (282a and 282b) and a pair of attachment pieces 281c and 281d (282c and 282d). As illustrated in FIGS. 33 and 35, the engagement piece 281a (282a) integrally extends from an upper end portion of a base portion 281e so as to extend along the upper surface portion 251, so that the engagement piece 281a (282a) is engaged with/disengaged from the rotation allowing hole portion 251b1 (251c1), and so that the engagement piece 281a (282a) is engaged with the pushing portion 231e (231g) provided at the housing 230. Further, in order to firmly engage with the pushing portion 231e (231g), an end portion of the engagement piece 281a (282a) is formed to curve. More specifically, a portion of the end portion of engagement piece 281a (282a) is formed in a waveform in this embodiment so that the wave-formed portion is positioned so as to correspond to the rotation allowing hole portion 251b1 (251c1).

As illustrated in FIG. 32, the engagement piece 281a (282a) is engaged with (fitted into) the rotation allowing hole portion 251b1 (251c1) when the engagement piece 281a (282a) is in an initial condition (i.e. in a condition where the engagement piece 281a (282a) is attached at the equalizer 250) and is in an engagement position by which a rotation of the arm portion 213b (223b) towards the rotation allowing hole portion 251b1 (251c1) is restricted. When the equalizer 250 is driven between the actuation position and the release position, the engagement piece 281a (282a) is not pushed by the pushing portion 231e (231g) provided at the housing 230, thereby retaining the engagement piece 281a (282a) at the engagement position.

On the other hand, when the equalizer 250 is moved from the release position to the wire detachment position, the engagement piece 281a (282a) is pushed by the pushing portion 231e (231g) provided at the housing 230, thereby moving the engagement piece 281a (282a) from the engagement position to the release position. In the state where the engagement piece 281a (282a) is moved from the engagement position to the release position, the engagement between the engagement piece 281a (282a) and the rotation allowing hole portion 251b1 (251c1) is cancelled, thereby allowing the rotation of the arm portion 213b (223b) towards the rotation allowing hole portion 251b1 (251c1). Additionally, the engagement piece 281a (282a) is returned to the engagement position from a disengagement position when the engagement piece 281a (282a) is released from being pushed by the pushing portion 231e (231g) provided at the housing 230.

As illustrated in FIGS. 34 and 35, the engagement piece 281b (282b) integrally extends from a lower end portion of the base portion 281e (282e) so as to extend along the lower surface portion 252, so that the engagement piece 281b (282b) is engaged with/disengaged from the rotation allowing hole portion 252b1 (252c1), and so that the engagement piece 281b (282b) is engaged with the pushing portion 231f (231h) provided at the housing 230. Further, in order to firmly engage with the pushing portion 231f (231h), an end portion of the engagement piece 281b (282b) is formed to curve. More specifically, a portion of the end portion of engagement piece 281b (282b) is formed in a waveform in this embodiment so that the wave-formed portion is positioned so as to correspond to the rotation allowing hole portion 252b1 (252c1).

Further, the engagement piece 281b (282b) is engaged with (fitted into) the rotation allowing hole portion 252b1 (252c1) when the engagement piece 281b (282b) is in an initial condition (i.e. in a condition where the engagement piece 281b (282b) is attached at the equalizer 250) and is in an engagement position by which a rotation of the arm portion 213c (223c) towards the rotation allowing hole portion 252b1 (252c1) is restricted. When the equalizer 250 is driven between the actuation position and the release position, the engagement piece 281b (282b) is not pushed by the pushing portion 231f (231h) provided at the housing 230, thereby retaining the engagement piece 281b (282b) at the engagement position.

On the other hand, when the equalizer 250 is moved from the release position to the wire detachment position, the engagement piece 281b (282b) is pushed by the pushing portion 231f (231h) provided at the housing 230, thereby moving the engagement piece 281b (282b) from the engagement position to the release position. In the state where the engagement piece 281b (282b) is moved to the release position from the engagement position, the engagement between the engagement piece 281b (282b) and the rotation allowing hole portion 252b1 (252c1) is cancelled, thereby allowing the rotation of the arm portion 213c (223c) towards the rotation allowing hole portion 252b1 (252c1). Additionally, the engagement piece 281b (282b) is returned to the engagement position from the disengagement position when the engagement piece 281b (282b) is released from being pushed by the pushing portion 231f (231h) provided at the housing 230.

The attachment piece 281c (282c) integrally extends from the upper end portion of the base portion 281e (282e) so as to extend along the upper surface portion 251 in the same direction as the engagement piece 281a (282a) extends. Further, the attachment piece 281c (282c) includes an attachment hole into which a smaller diameter shaft portion of the connecting pin 253 (254) fits. The attachment piece 281d (282d) integrally extends from the lower end portion of the base portion 281e (282e) so as to extend along the lower surface portion 252 in the same direction as the engagement piece 281b (282b) extends. Further, the attachment piece 281d (282d) includes an attachment hole into which a greater diameter shaft portion of the first connecting pin 253 (254) fits.

In the above-described second embodiment, when the brake switch SW1 is operated while each of the parking brake apparatuses PBa and PBb is in the release state, as is the case with the above-described first embodiment, the equalizer 250 is moved from the release position illustrated in FIG. 31 to the actuation position illustrated in FIG. 31. As a result, each of the parking brake apparatuses PBa and PBb is shifted from the release state to the actuation state (the brake state). Further, when the release switch SW2 is operated while each of the parking brake apparatuses PBa and PBb is in the actuation state, as is the case with the above-described first embodiment, the equalizer 250 is moved from the actuation position illustrated in FIG. 31 to the release position illustrated in FIG. 31. As a result, each of the parking brake apparatuses PBa and PBb is shifted from the actuation state to the release state.

In the second embodiment, when the detachment switch SW3 is operated in the state where the cables 210 and 220 are not attached to the electric actuator EA2, the electric motor EM2 is rotatably driven in the inverse direction and the screw shaft 261 of the conversion mechanism B2 is rotated in the inverse direction. Accordingly, the nut 262 and the equalizer 250 are moved towards the wire detachment position. When the nut 262 and the equalizer 250 are moved to the wire detachment position, the detachment position limit switch LS2 is operated and turned ON by the equalizer 250 and outputs the electric signal, indicating that the detachment position limit switch LS2 is ON, to the electric control unit ECU2. Then, the electric motor EM2 is stopped being rotatably driven in the inverse direction on the basis of the control signal from the electric control unit ECU2. Additionally, in a case where the above-described cable-type driving force transmission mechanism is modified so as not to include the detachment position limit switch LS2 and so that the movements of the nut 262 and the equalizer 250 are stopped by the housing 230 when the nut 262 and the equalizer 250 are moved at the wire detachment position, a current to the electric motor EM2 becomes equal to or more than a set value when the nut 262 and the equalizer 250 are moved at the wire detachment position. Accordingly, the cable-type driving force transmission mechanism may be modified so as to stop the rotational drive of the electric motor EM2 in the inverse direction on the basis of the fact that the current to the electric motor EM2 becomes equal to or more than the set value (i.e. by reading an electric current value that is equal to or more than the set value).

As illustrated in FIGS. 38 to 43, when the equalizer 250 is moved to the wire detachment position, the engagement piece 281a and 281b (282a and 282b) of the second plate spring 281 (282) are pushed by the respective pushing portions 231e and 231f (231g and 231h), which are provided at the housing main body 231, so that the engagement pieces 281a and 281b (282a and 282b) are moved to the disengagement position at which the engagement pieces 281a and 281b (282a and 282b) are disengaged from the respective rotation allowing hole portions 251b1 and 252b1 (251c1 and 252c1). Accordingly, the arm portions 213b and 213c (223b and 223c) of the cable end pin 213 (223) are turned to be in a state where rotation of the second arm portions 213b and 213c (223b and 223c) are not restricted by the respective engagement pieces 281a and 281b (282a and 282b) of the second plate spring 281 (282).

Accordingly, as illustrated in FIGS. 38 to 41, after the arm portions 213b and 213c (223b and 223c) of the cable end pin 213 (223), which is formed in the T-shape and which is fixed at the inner wire 21 (221), are inserted within the housing 230 via the insertion hole 231c1 (231d1) provided at the outer tube attachment portion 231c (231d) and via the insertion holes 231i (231j) provided at the housing main body 231, as is the case with the above-described first embodiment, the cable end pin 213 (223) is connectable to the equalizer 250 from the outside of the housing 230 while the equalizer 250 is at the wire detachment position by rotating the cable end pin 213 (223) by substantially 90 degrees in the positive direction with the shaft portion 213a (223a) as the axis.

Figure 39:
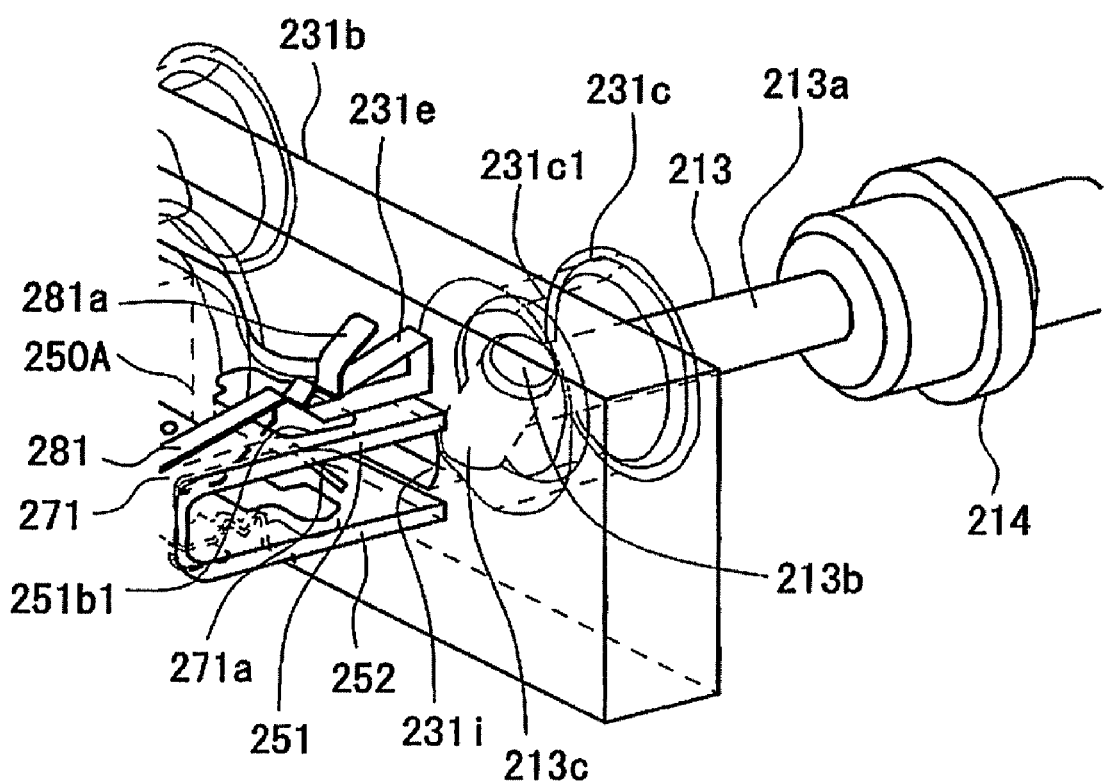
FIG. 39 is a perspective view corresponding to FIG. 32 and illustrating a process in which the casing cap, illustrated in FIG. 38, contacts the cable end pin.
Figure 40:
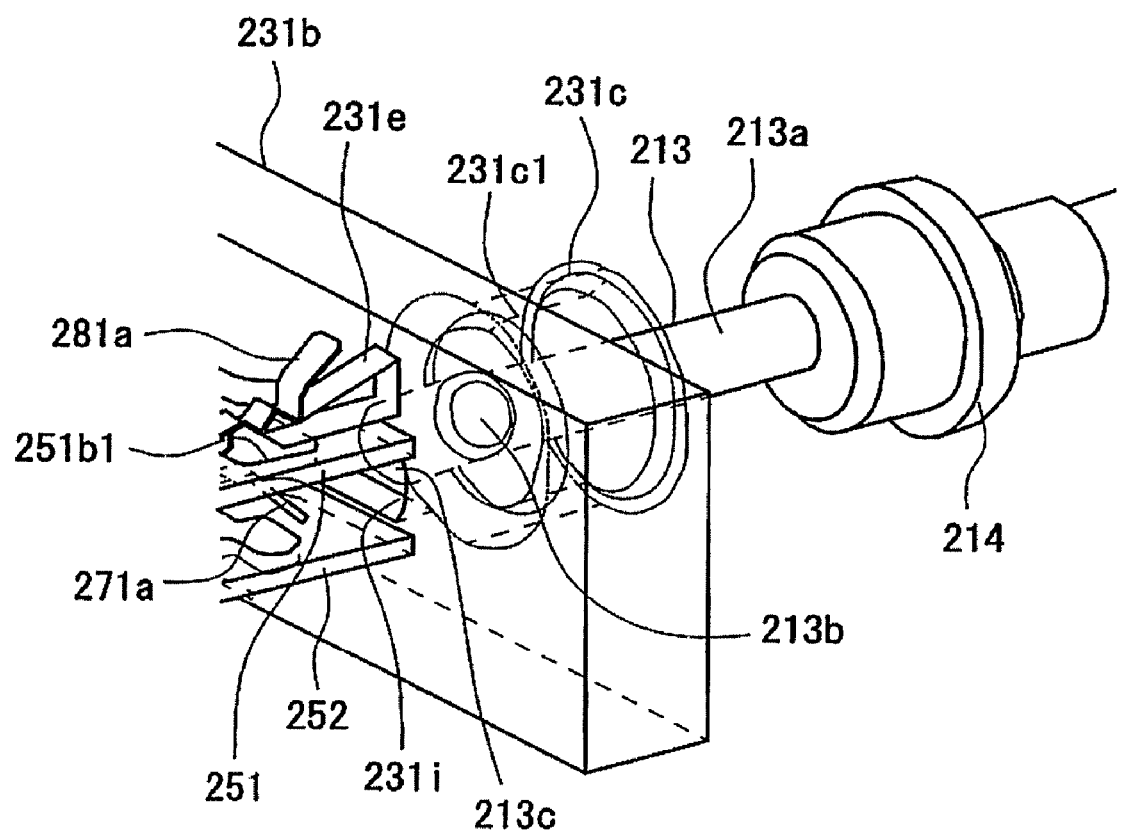
FIG. 40 is a perspective view corresponding to FIG. 32 and illustrating a process of inserting the cable end pin, illustrated in FIG. 39, into a tapered hole portion of an insertion hole provided at a wall portion of a housing main body.
Figure 41:
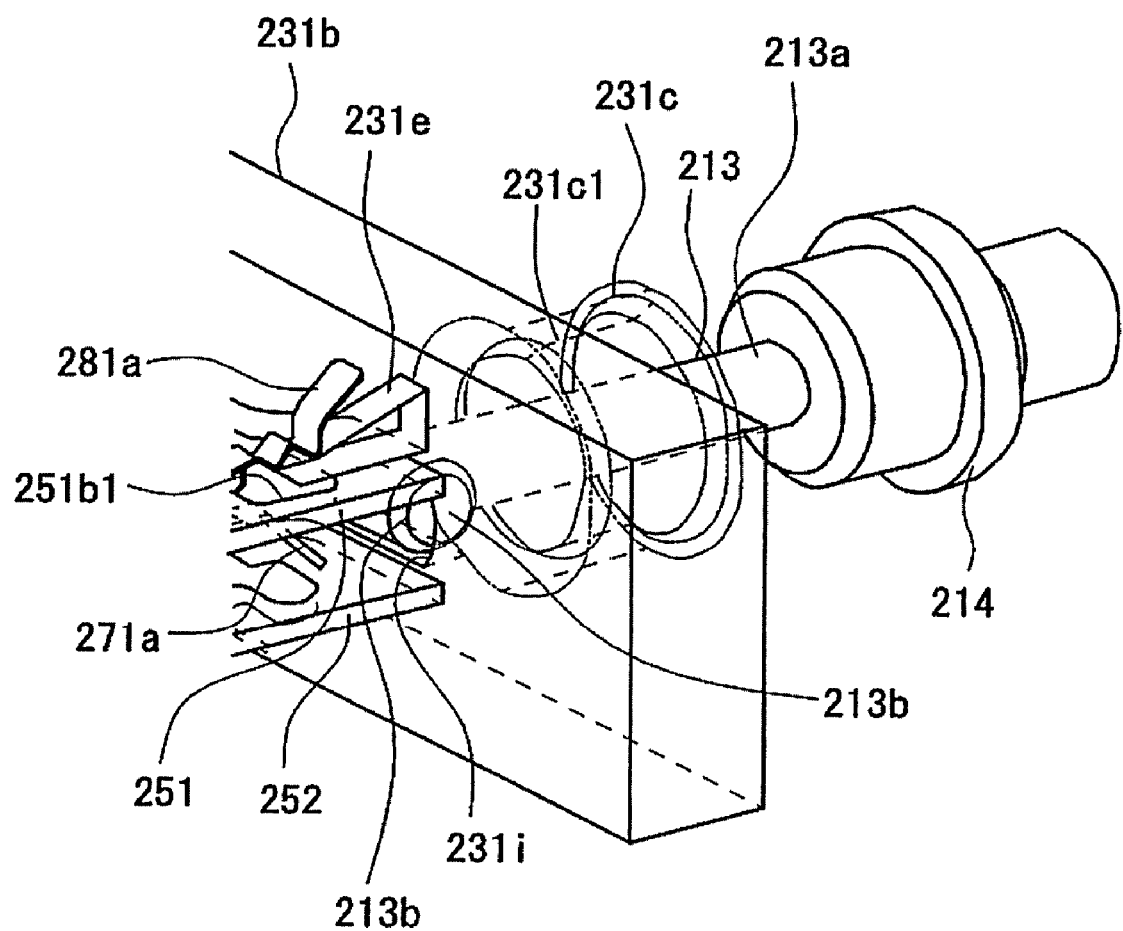
FIG. 41 is a perspective view corresponding to FIG. 32 and illustrating a process of inserting the cable end pin, illustrated in FIG. 40, into a laterally elongated hole portion of the insertion hole provided at the wall portion of the housing main body.

Additionally, the arm portions 213b and 213c (223b and 223c) of the cable end pin 213 (223) may be inserted into the housing 230, as illustrated in FIGS. 39 to 41, in the manner where: firstly, the casing cap 214 (215) may be pushed towards the left side in FIG. 39; secondly, the casing cap 214 (215) may be pushed further to the left in FIG. 40 while rotating the cable end pin 213 (223); and then, the cable end pin 213 (223) is positioned so that the arm portions 213b and 213c (223b and 223c) are positioned in a horizontal manner.

Further, in the second embodiment, when the return switch SW4 is operated while the cable end pin 213 (223) is connected to the equalizer 250, the electric motor EM2 is rotatably driven in the positive direction and the screw shaft 261 of the conversion mechanism B2 is rotated in the positive direction, thereby moving the nut 262 and the equalizer 250 towards the release position. Accordingly, when the nut 262 and the equalizer 250 are moved at the release position, the release position limit switch LS1 is operated and turned ON by the equalizer 250 and outputs the electric signal, indicating that the release position limit switch LS1 is ON, to the electric control unit ECU2. Then, the electric motor EM2 is stopped being rotatably driven in the positive direction on the basis of the control signal from the electric control unit ECU2.

Figure 43:
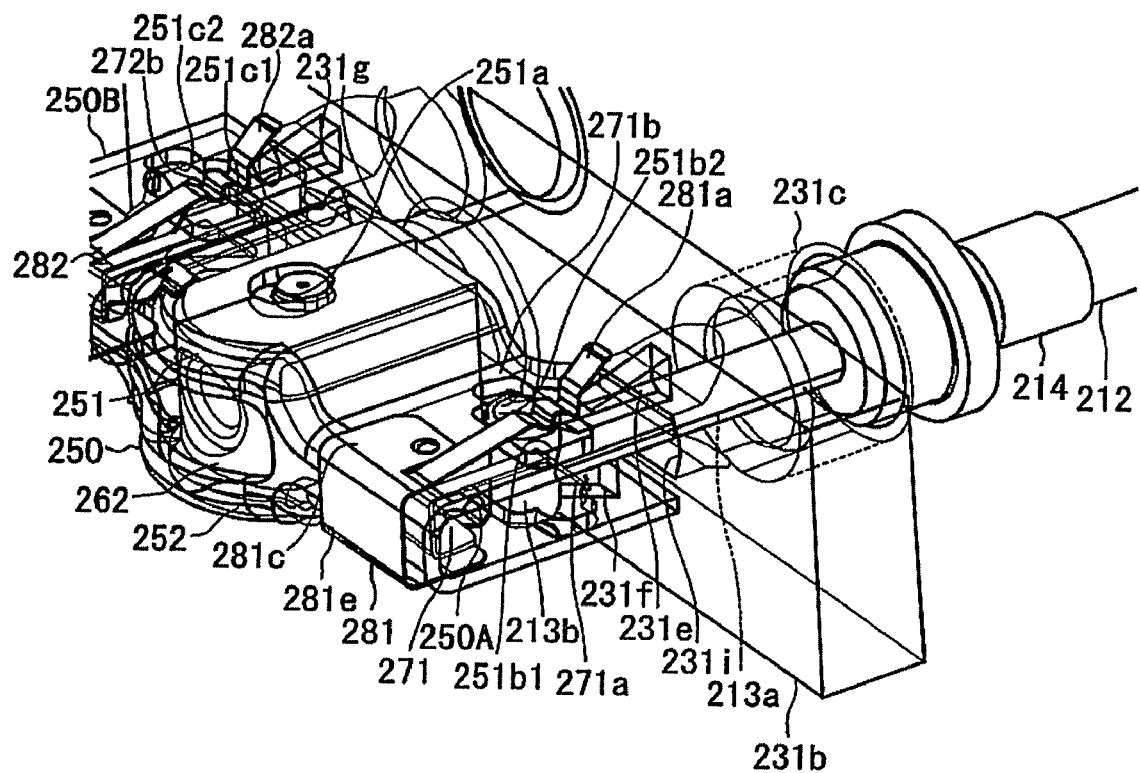
FIG. 43 is a perspective view corresponding to FIG. 32 and illustrating a state where the cable end pin, illustrated in FIG. 42, is attached at the equalizer.
Figure 44:
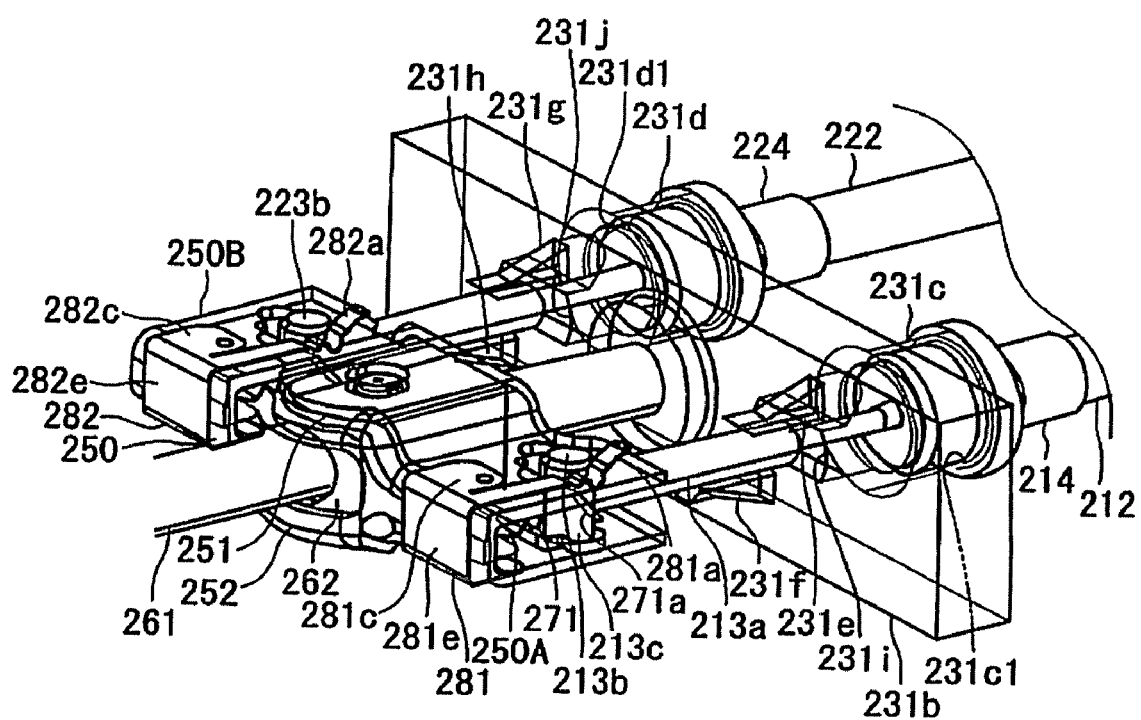
FIG. 44 is a perspective view corresponding to FIG. 32 and illustrating a process of attaching the casing cap, illustrated in FIG. 43, to an outer tube attachment portion.

When the equalizer 250 moves from the wire detachment position towards the release position, as illustrated in FIGS. 43 and 44, each of the engagement pieces 281a and 281b (282a and 282b) of the second plate spring 281 (282) is returned to the engagement position from the disengagement position, so that the rotation of the arm portions 213b and 213c (223b and 223c) is restricted. Then, when the casing cap 214 (224) is inserted into the insertion hole 231c1 (231d1) of the outer tube attachment portion 231c (231d) and the clip is attached at the slit of the outer tube attachment portion 231c (231d) and the slit 214a (224a) of the casing cap 214 (224), assembly of the cable 210 (220) to the electric actuator EA2 is competed.

In the case where the equalizer 250 is moved from the wire detachment position to the actuation position by the operation of the brake switch SW1 (or, in the case where the equalizer 250 is moved to the release position by the operation of the return switch SW4), the second end portion 211b (221b) of the inner wire 211 (221) is connected to the actuation member PBa1 (PBb1) of the parking brake apparatus PBa (PBb). If the second end portion of the outer tube 212 (222) is retained at the retaining member for retaining the actuation member PBa1 (PBb1), as illustrated in FIG. 44, a reaction force of the tensile force acting on the inner wire 211 (221) acts on the outer tube 212 (222). Hence, in this case, the casing cap 214 (224), which is integrally provided at the outer tube 212 (222), is pulled into the insertion hole 231c1 (231d1) of the outer tube attachment portion 231c (231d), thereby automatically attaching the cable 210 (220) with the equalizer 250.

Further, in the second embodiment, as illustrated in FIG. 31, when the equalizer 250 moves between the actuation position and the release position while the cable 210 (220) is attached between the electric actuator EA2 and the parking brake apparatus PBa (PBb), the engagement pieces 281a and 281b (282a and 282b) of the second spring plate 281 (282) are positioned at the engagement positions, thereby restricting the rotation of the arm portions 213b and 213c (223b and 223c). Therefore, in this case, in addition to the engagement pieces 271a and 271b (272a and 272b) of the first plate spring 271 (272) restricting the inverse rotation of the cable end pin 213 (223), the engagement pieces 281a and 281b (282a and 282b) of the second plate spring 281 (282) restrict the inverse rotation of the cable end pin 213 (223), thereby surely maintaining the connection between the cable end pin 213 (223) and the equalizer 250.

Further, in the second embodiment, the cable 210 (220) is detached from the electric actuator EA1 in an order inverse to the above-described attaching order. More specifically, the cable 210 (220) is detached from the electric actuator EA2 in the manner where: firstly, detaching the casing cap 214 (224) from the outer tube attachment portion 231c (231d); secondly, canceling the connection between the second end portion 211b (221b) of the inner wire 211 (221) and the actuation member PBa1 (PBb1) of the parking brake apparatus PBa (PBb); and thirdly, canceling the connection between the second end portion of the outer tube 212 (222) and the retaining member for retaining the actuation member PBa1 (PBb1).

Figure 42:
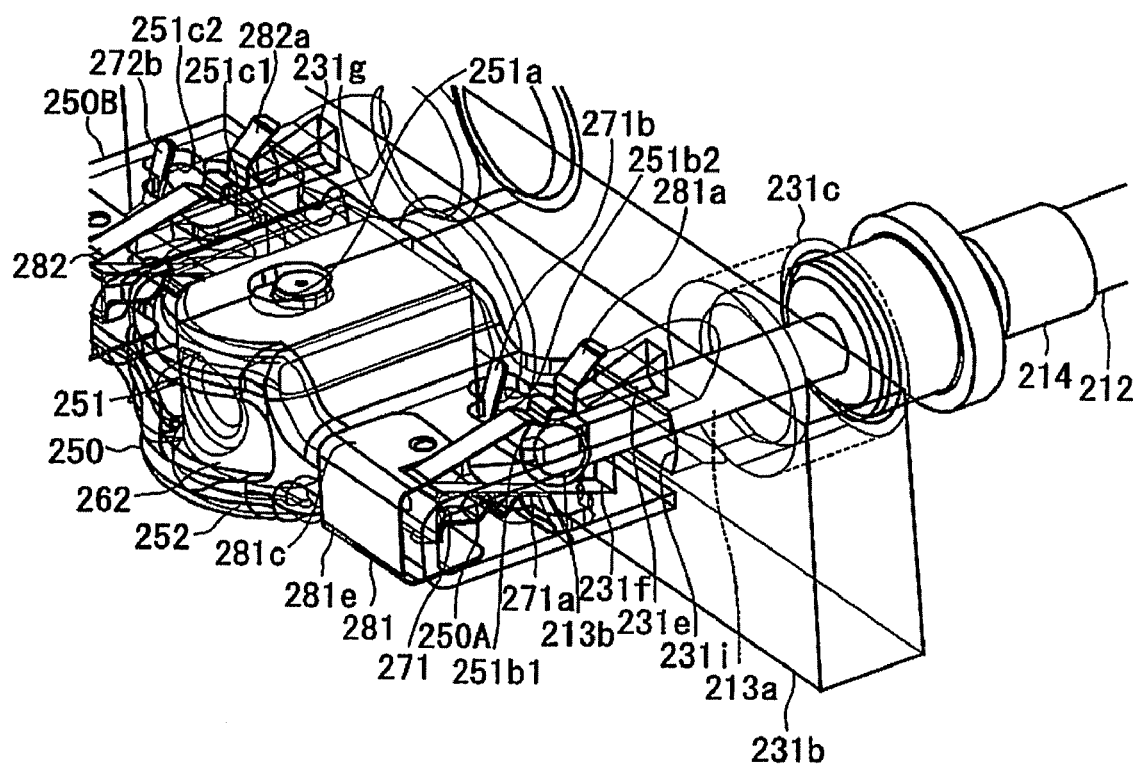
FIG. 42 is a perspective view corresponding to FIG. 32 and illustrating a process of attaching the cable end pin, illustrated in FIG. 41, to the equalizer.

Then, the equalizer 250 is moved to the wire detachment position illustrated in FIG. 43, and as illustrated in FIG. 42, the cable end pin 213 (223) is rotated in the inverse direction so as to resist a biasing force of the pair of the engagement pieces 271a and 271b (272a and 272b) of the first plate spring 271 (272) while the second plate spring 281 (282) is at the disengagement position. Then, as illustrated in FIGS. 41 to 38, the cable end pin 213 (223) is pulled out from the housing 230. As a result, the connection between the inner wire 211 (221) and the equalizer 250 is cancelled.

Accordingly, in the second embodiment, the effects and advantages disclosed in the above-mentioned first embodiment are obtained. Further, by providing the second plate spring 281 (282) at the equalizer 250, a possibility of the cable end pin 213 (223) being disengaged from the equalizer 250 is effectively reduced without disturbing the detachability of the cable end pin 213 (223) relative to the equalizer 250. Moreover, the reliability at the connecting portion between the cable end pin 213 (223) and the equalizer 250 is further enhanced.

Further, in the second embodiment, even if the equalizer 250 attempts to move from the release position to the wire detachment position by the rotational driving force of the electric motor EM2 because of an error, an improper operation or the like while the cable 210 (220) is assembled to the electric actuator EA2, the movement of the equalizer 250 towards the wire detachment position is restricted by the end portion of the shaft portion 213a (223a) of the cable end pin 213 (223) contacting the casing cap 214 (224). Accordingly, once the cable 210 (220) is assembled to the electric actuator EA2, the error, the improper operation or the like, by which the equalizer 250 is moved from the release position to the wire detachment position, is mechanically prevented from occurring by the end portion of the shaft portion 213a (223a) of the cable end pin 213 (223) contacting the casing cap 214 (224).

Further, in the second embodiment, when the equalizer 250 is positioned at the wire detachment position, a portion of the shaft portion 213a (223a) of the cable end pin 213 (223), which is connected to the equalizer 250, extends towards the outside of the housing 230 for the predetermined amount (see FIGS. 38 to 43). Therefore, in the process of attaching/detaching the inner wire 211 (221) to/from the equalizer 250, the recessed portion 213a2 (223a2), which is provided at the shaft portion 213a (223a) of the cable end pin 213 (223) outwardly extending from the housing 230, is retained by the operation by means of the specific tool and the like from the outside of the housing 230. Accordingly, in the process of attaching/detaching the inner wire 211 (221) to/from the equalizer 250, the cable end pin 213 (223) is easily rotated (either in the positive direction or the inverse direction) by the operation from the outside of the housing 230, and the attachability and detachability of the cable end pin 213 (223) relative to the equalizer 250 is enhanced.

In the above-described second embodiment, in the sate where the casing caps 214 and 224 (a restricting member) are inserted into the respective insertion holes 231c1 and 231d1 provided at the respective outer tube attachment portions 231c and 231d and where the casing caps 213 and 224 are attached at the respective outer tube attachment portions 231c and 231d by means of the clips, the movement of the equalizer 250 from the release position to the wire detachment position is restricted by the casing caps 214 and 224 contacting the respective shaft portions 213a and 223a of the respective cable end pins 213 and 223. However, the cable-type driving force transmission mechanism of the second embodiment may be modified so as to restrict the movement of the equalizer 250 from the release position to the wire detachment position by the casing caps 214 and 224 being attached into the respective insertion holes 231c1 and 231d1 of the respective outer tube attachment portions 231c and 231d so that the casing caps 214 and 224 extend towards the inside of the housing 230 and by the casing caps 214 and 224 directly contacting the equalizer 250.

Further, the alternative embodiment of the first embodiment may be adapted to the cable-type driving force transmission mechanism of the second embodiment.

Further, in the above-described second embodiment, the first plate springs 271 and 272, and the second plate springs 281 and 282 are fixed at the equalizer 250. However, the cable-type driving force transmission mechanism of the second embodiment may be modified so as to eliminate the second plate springs 281 and 282 and so that only the first plate springs 271 and 272 are fixed at the equalizer 250.

In the above-described embodiments, two of the actuation members (PBa1 and PBb1), two of the cables (10 and 20/210 and 220), two of the output portions (50A and 50B/250A and 250B) of the driving member (equalizer 50/250), two of the first plate springs (71 and 72/271 and 272) and two of the second plate springs (281 and 282) are provided to the cable-type driving force transmission mechanism. However, the cable-type driving force transmission mechanism of the first and second embodiments may be modified so as to include one of each of the above-described components.

In the above-described embodiments, the positive direction of when the cable (10, 20, 210, 220) is rotated is set in the same direction as the clockwise direction. However, the positive direction may be set in the same direction as the counterclockwise direction.

In the above-described embodiments, the actuation member (PBa1, PBb1) serves as the actuation member (PBa1, PBb1) of the parking brake apparatus (PBa, PBb) for the vehicle. Further, in the above-described embodiments, the electric actuator (EA1/SE2) is attached at the vehicle body via the housing (30/230). In other words, in the above-described embodiments, the cable-type driving force transmission mechanism is adapted to the electric parking brake apparatus for the vehicle. However, the cable-type driving force transmission mechanism of the present invention may be adapted to apparatuses and devices other than the electric parking brake apparatus for the vehicle in the same manner as described above or by appropriately modifying the above-described cable-type driving force transmission mechanism.

In the above-embodiments, the end pin attachment hole (51, 51c, 52b, 52c, 251b, 251c, 252b, 252c) may be include the accommodation-and-retention portion (51b3, 51c3, 52b3, 52c3, 251b3, 251c3, 252b3, 252c3) for accommodating a portion of the arm portion (13b, 13c, 23b, 23c, 213b, 213c, 223b, 223c) after the cable end pin (13, 23, 113, 123, 213, 223) is rotated in the positive direction. Further, the cut-out portion (113b1, 113c1) may be provided at the arm portion (113b, 113c, 123b, 123c) of the cable end pin (113, 123) in order to reduce the elastic deformation of the engagement piece (71a, 71b, 72a, 72b) of the first plate spring (71, 72) when the cable end pin (113, 123) is attached to and detached from the equalizer (50). Further, the actuation member (PBa1, PBb1) serves as the actuation member (PBa1, PBb1) of the parking brake apparatus (PBa, PBb) for the vehicle. Furthermore, the electric actuator (EA1, EA2) may be attached to the vehicle body at the housing (30, 230).

In cable-type driving force transmission mechanism of the embodiments, the cable end pin (13, 23, 113, 123, 213, 223) may be rotated by a biasing force of the engagement pieces (71a, 71b 72a, 72b, 271a, 271b, 272a, 272b) by substantially 90 degrees in the positive direction with the shaft portion (13a, 23a, 113a, 123a, 213a, 223a) as the axis by inserting the cable end pin (13, 23, 113, 123, 213, 223), which is fixed at the first end portion (11a, 21a, 211a, 221a) of the inner wire (11, 21, 211, 221) and which is formed in the T-shape, between the pair of end pin attachment holes (51b and 52b, 51c and 52c, 251b and 252b, 251c and 252c) (first and second end pin attachment holes) of the equalizer (50, 250) while the first plate spring (71, 72, 271, 272) is attached to the equalizer (50, 250). Accordingly, the cable end pin (13, 23, 113, 123, 213, 223) is attachable to the pair of end pin attachment holes (51b and 52b, 51c and 52c, 251b and 252b, 251c and 252c) of the equalizer (50, 250). Further, the first end portion (11a, 21a, 211a, 221a) of the inner wire (11, 21, 211, 221) is connectable to the equalizer (50, 250) via the cable end pin (13, 23, 113, 123, 213, 223).

Accordingly, the first end portion (11a, 21a, 211a, 221a) of the inner wire (11, 21, 211, 221) is connected to the equalizer (50, 250) in the state where the equalizer (50, 250), to which the first plate spring (71, 72, 271, 272) is preliminarily attached, is assembled within the housing (30, 230), by inserting the cable end pin (13, 23, 113, 123, 213, 223), which is fixed at the first end portion (11a, 21a, 211a, 221a) of the inner wire (11, 21, 211, 221) and which is formed in the T-shape, to the inside of the housing (30, 230) from the outside thereof via the outer tube attachment portion (31b, 31c, 231c, 231d) of the housing (30, 230) before the end portion of the outer tube (12, 22, 212, 222) at the housing side is attached to the outer tube attachment portion (31b, 31c, 231c, 23ad) provided at the housing (30, 230). Further, the end portion of the outer tube (12, 22, 212, 222) of the cable (10, 20, 210, 220) at the housing side is attachable relative to the outer tube attachment portion (31b, 31c, 231c, 231d) provided at the housing (30, 230) from the outside of the housing (30, 230).

Accordingly, the cable (10, 20, 210, 220) is assembled within the housing (30, 230) by the relating components and parts at the end portion of the cable (10, 20, 210, 220) at the housing side after each component is assembled into the housing (30, 230). Therefore, the cable (10, 20, 210, 220) does not need to be handled in the production process in the production line in the state where the cable (10, 20, 210, 220) is attached to the housing (30, 230). Therefore, productivity is enhanced. Further, in the sate where the cable end pin (13, 23, 113, 123, 213, 223) is attached to the equalizer (50, 250), the pair of the engagement pieces (71a and 71b, 72a and 72b, 271a and 271b, 272a and 272b) of the first plate spring (71, 72, 271, 272) returns to the initial position and restricts the inverse rotation of the cable end pin (13, 23, 113, 123, 213, 223). Accordingly, the connection of the cable end pin (12, 23, 113, 123, 213, 223) to the equalizer (50, 250) is surely and firmly maintained.

According to the embodiments, each of the pair of the end pin attachment holes (51b, 51c, 52b, 52c, 251b, 251c, 252b, 252c), which are formed at the equalizer (50, 250), includes the accommodation-and-retention portion (51b3, 51c3, 52b3, 52c3, 251b3, 251c3, 252b3, 252c3) for accommodating and retaining a portion of the arm portion (13b, 13c, 23b, 23c, 113b, 113c, 123b, 123c, 213b, 213c, 223b, 223c) after the cable end pin (13, 23, 113, 123, 213, 223) is rotated in the positive direction.

Accordingly, even if the tensile force of the inner wire (11, 21, 211, 221) is decreased, the cable end pin (13, 23, 113, 123, 213, 223) less likely to rotate relative to the accommodation-and-retention portion (51b3, 51c3, 52b3, 52c3, 251b3, 251c3, 252b3, 252c3) of the end pin attachment hole (51b, 51c, 52b, 52c, 251b, 251c, 252b, 252c) formed at the equalizer (50, 250). Accordingly, the reliability at the connecting portion between the cable end pin (13, 23, 113, 123, 213, 223) and the equalizer (50, 250) is enhanced.

According to the embodiments, each of the arm portions (113b, 113c, 123b, 123c) of the cable end pin (113, 123) includes the cut-out portion (113b1, 113c1, 123b1, 123c1) for reducing an amount of the elastic deformation of each of the engagement pieces (71a, 71b, 72a, 72b) of the first plate spring (71, 72) when the cable end pin (113, 123) is attached to and detached from the driving member (50).

Accordingly, the cable (10, 20) is easily attached to the equalizer (50) by rotating the cable end pin (113, 123) in the positive direction. Further, the cable (10, 20) is easily detached from the equalizer (50) by rotating the cable end pin (113, 123) in the inverse direction. Accordingly, by using the cable end pin (113, 123) as a part for inspection when the completed product of the electric actuator (EA1) after each component is assembled within the housing (30), the productivity of the electric actuator (EA1) is enhanced.

According to the embodiments, the actuation member serves as an actuation member (PBa1, PBb1) for a parking brake apparatus (PBa, PBb) for the vehicle and the electric actuator (EA1, EA2) is attached to the vehicle body at the housing (30, 230).

According to the embodiments, the second plate spring (281, 282), which is fixed at the driving member (250) and whose portion is engageable with/disengageable from the rotation allowing hole portion (251b1, 251c1, 252b1, 252c1), restricts the rotation of each of the arm portions (213b, 213c, 223b, 223c) when the second plate spring (281, 282) is at an engagement position, and allows the rotation of each of the arm portions (213b, 213c, 223b, 223c) when the second plate spring (281, 282) is at an disengagement position. Further, the pushing member (231e, 231f, 231g, 231h) provided at the housing (230) pushes a portion of the second plate spring (281, 282) in response to a movement of the driving member (250) towards the pushing member (231e, 231f, 231g, 231h). The portion of the second plate spring (281, 282) is positioned at the engagement position when the driving member (250) moves between an actuation position, at which the actuation member (PBa1, PBb1) is actuated, and a release position, at which the actuation of the actuation member (PBa1, PBb1) is released. Further, the portion of the second plate spring (281, 282) is pushed to the disengagement position from the engagement position by the pushing member (231e, 231f, 231g, 213h) when the driving member (250) is moved from the release position to a wire detachment position, at which the inner wire (211, 221) is detachable from the driving member (250**).

In this case, when the equalizer (250) moves from the release position to the wire detachment position, a portion of the second plate spring (281, 282) is pushed to the disengagement position from the engagement position by means of the pushing portion (231e, 231f, 231g, 231h) provided at the housing (230). Accordingly, the portion of the second plate spring (281, 282) is disengaged from the rotation allowing hole portion (251b1, 252b1, 251c1, 252c1) of the equalizer (250), and the rotation of the arm portion (213b, 213c, 223b, 223c) of the cable end pin (213, 223) is allowed. Further, when the equalizer (250) moves from the wire detachment position to the release position, the portion of the second plate spring (281, 282) is returned to the engagement position from the disengagement position. Accordingly, the portion of the second plate spring (281, 282) engaged with the rotation allowing hole portion (251b1, 252b1, 251c1, 252c1) of the equalizer (250), thereby restricting the rotation of the arm portion (213b, 213c, 223b, 223c) of the cable end pin (213, 223**).

Accordingly, the cable end pin (213, 223) is attachable to the end pin attachment hole (251b, 252b, 251c, 252c) of the equalizer (250) while the equalizer (250) is positioned at the wire detachment position by inserting the cable end pin (213, 223) of the inner wire (211, 221) between a pair of end pin attachment holes (251b and 252b, 251c and 252c) of the equalizer (250) and then rotating the cable end pin (213, 223) by the substantially 90 degrees in the positive direction with the shaft portion (213a, 223a) as the axis. Further, by rotating the cable end pin (213, 223) by the substantially 90 degrees in the inverse direction with the shaft portion (213a, 223a) as the axis, the cable end pin (213, 223) is disengaged from a pair of the end pin attachment hole (251b and 252b, 251c and 252c**).

On the other hand, in the case where the equalizer (250) moves between the release position to the actuation position, the portion of the second plate spring (281, 282) is maintained in the state where the portion of the second plate spring (281, 282) is engaged with the rotation allowing hole portion (251b1, 252b1, 251c1, 252c1) of the equalizer (250), thereby restricting the rotation of the arm portion (213b, 213c, 223b, 223c) of the cable end pin (213, 223). Accordingly, in this case, in addition to a pair of the engagement pieces (271a and 271b, 272a and 272b) of the first plate spring (271, 272) restricting the inverse rotation of the cable end pin (213, 223), the portion of the second plate spring (281, 282) restricts the inverse rotation of the cable end pin (213, 223). As a result, the connection between the cable end pin (213, 223) and the equalizer (250) is surely and firmly maintained.

Accordingly, in this case, the possibility of the cable end pin (213, 223) being disengaged from the equalizer (250) is effectively reduced without disturbing the detachability of the cable end pin (213, 223) relative to the equalizer (250) by providing the pushing portion (231e, 231f, 231g, 231h) at the housing (230). As a result, the reliability at the connecting portion between the cable end pin (213, 223) and the equalizer (250**) is further enhanced.

According to the embodiments, the outer tube (212, 222) includes the casing cap (214, 224) at the end portion of the outer tube (212, 222) at the housing side, the casing cap (214, 224) allows the movement of the equalizer (250) from the release position to the wire detachment position in a state where the end portion (212a, 222a) of the outer tube (212, 222) at the housing side is not attached to the outer tube attachment portion (231c, 231d) provided at the housing (230) and restricts the movement of the equalizer (250) from the release position to the wire detachment position in a state where the end portion (212a, 222a) of the outer tube (212, 222) at the housing side is attached to the outer tube attachment portion (231c, 231d).

According to the embodiments, the outer tube attachment portion (231c, 231d), provided at the housing (230), includes the insertion hole (231c1, 231d1), into which the casing cap (214, 224) is insertable. Further, the movement of the equalizer (250) from the release position to the wire detachment position is restricted by the casing cap (214, 224) contacting the shaft portion (213a, 223a) of the cable end pin (213, 223) in the state where the casing cap (214, 224) inserted into and attached to the insertion hole (213c1, 231d1).

In this case, even if attempting to move the equalizer (250) from the release position to the wire detachment position in the state where the first end portion (211a, 221a) of the inner wire (211, 221) is connected to the equalizer (250) via the cable end pin (213, 223) and where the end portion of the outer tube (212, 222) at the housing side is attached at the outer tube attachment portion (231c, 231d) of the housing (230), the casing cap (214, 224) restricts the movement of the equalizer (250) from the release position to the wire detachment position. Accordingly, the error, the improper operation and the like, by which the equalizer (250) is moved from the release position to the wire detachment position, in the state where the assembling of each component to the housing (230) is completed, is mechanically prevented from occurring by the casing cap (214, 224).

According to the embodiments, the shaft portion (213a, 223a) of the cable end pin (213, 223), which is connected to the equalizer (250), extends to the outside of the housing (230) when the equalizer (250**) is at the wire detachment position.

In this case, the shaft portion (213a, 223a) of the cable end pin (213, 223) extending to the outside of the housing (230) may be retained by the operation from the outside of the housing (230) by means of the tool and the like while the equalizer (250) is at the wire detachment position. Accordingly, the cable end pin (213, 223) is easily rotated (either in the positive direction or the inverse direction) by the operation from the outside of the housing (230) when the inner wire (211, 221) is attached to/detached from the equalizer (250). Hence, the attachability and the detachability of the cable end pin (213, 223) relative to the equalizer (250) is enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A cable-type driving force transmission mechanism comprising:
    an electric actuator including a housing attached to a support member, an electric motor attached at the housing, a conversion mechanism, which is provided within the housing and converts a rotational driving force of the electric motor into a linear driving force, and a driving member, which is linearly driven by the linear driving force generated by converting the rotational driving force of the electric motor into the linear driving force by the conversion mechanism and which includes first and second end pin attachment holes;
    a cable provided between the electric actuator and an actuation member for transmitting a driving force of the electric actuator to the actuation member via the cable and including an inner wire, which is detachably connected to the driving member at a first end portion of the inner wire and which is connected to the actuation member at a second end portion of the inner wire, and an outer tube, which covers an outer circumference of the inner wire except for both end portions thereof and which is detachably and immovably attached to an outer tube attachment portion, provided at the housing at an end portion of the outer tube at a housing side and is immovably attached to a retaining member for retaining the actuation member at an end portion of the outer tube at an actuation member side;
    a cable end pin formed in a T-shape and fixed at the first end portion of the inner wire, the cable end pin including a shaft portion extending in a wire longitudinal direction and first and second arm portions, each of which outwardly protrudes from an end portion of the shaft portion for a predetermined amount in a radial direction thereof; and
    a first plate spring fixed at the driving member and including first and second engagement pieces for rotating the cable end pin in a positive direction by substantially 90 degrees with the shaft portion with an axis while the first and second engagement pieces elastically deform and engage with different side surfaces of the first and second arm portions when the first and second arm portions of the cable end pin is inserted and attached between the first and second end pin attachment holes of the driving member and for restricting an inverse direction of the cable end pin by returning to an initial position after the cable end pin is rotated in the positive direction, wherein
    each of the first and second end pin attachment holes includes a rotation allowing hole portion for allowing a rotation of each arm portion and a deformation allowing hole portion for allowing an elastic deformation of each engagement piece of the first plate spring when the cable end pin is rotated in the positive direction with the shaft portion thereof as the axis, and wherein
    the first end portion of the inner wire is connected to the driving member via the cable end pin and the end portion of the outer tube at the housing side is attachable relative to the outer tube attachment portion, provided at the housing, from an outside of the housing.

2. The cable-type driving force transmission mechanism according to claim 1, wherein each of the first and second end pin attachment holes, which are formed at the driving member, includes an accommodation-and-retention portion for accommodating and retaining a portion of the arm portion after the cable end pin is rotated in the positive direction.

3. The cable-type driving force transmission mechanism according to claim 1, wherein each of the first and second arm portions of the cable end pin includes a cut-out portion for reducing an amount of the elastic deformation of each of the first and second engagement pieces of the first plate spring when the cable end pin is attached to and detached from the driving member.

4. The cable-type driving force transmission mechanism according to claim 1, wherein the actuation member serves as an actuation member for a parking brake apparatus for a vehicle and wherein the electric actuator is attached to a vehicle body at the housing.

5. The cable-type driving force transmission mechanism according to claim 1 further comprising:
    a second plate spring, which is fixed at the driving member and whose portion is engageable with/disengageable from the rotation allowing hole portion, the second plate spring restricting the rotation of each of the first and second arm portions when the second plate spring is at an engagement position, and allows the rotation of each of the first and second arm portions when the second plate spring is at an disengagement position; and
    a pushing member provided at the housing and pushing a portion of the second plate spring in response to a movement of the driving member towards the pushing member, wherein
    the portion of the second plate spring is positioned at the engagement position when the driving member moves between an actuation position, at which the actuation member is actuated, and a release position, at which the actuation of the actuation member is released, and wherein
    the portion of the second plate spring is pushed to the disengagement position from the engagement position by the pushing member when the driving member is moved from the release position to a wire detachment position, at which the inner wire is detachable from the driving member.

6. The cable-type driving member transmission mechanism according to claim 5, wherein the outer tube includes a restricting member at the end portion of the outer tube at the housing side, the restricting member allows the movement of the driving member from the release position to the wire detachment position in a state where the end portion of the outer tube at the housing side is not attached to the outer tube attachment portion provided at the housing and restricts the movement of the driving member from the release position to the wire detachment position in a state where the end portion of the outer tube at the housing side is attached to the outer tube attachment portion.

7. The cable-type driving member transmission mechanism according to claim 6, wherein the outer tube attachment portion, provided at the housing, includes an insertion hole, into which the restricting member is insertable, and wherein the movement of the driving member from the release position to the wire detachment position is restricted by the restricting member contacting the shaft portion of the cable end pin in a state where the restricting member inserted into and attached to the insertion hole.

8. The cable-type driving force transmission mechanism according to claim 5, wherein the shaft portion of the cable end pin, which is connected to the driving member, extends to an outside of the housing when the driving member is at the wire detachment position.

9. The cable-type driving force transmission mechanism according to claim 6, wherein the shaft portion of the cable end pin, which is connected to the driving member, extends to an outside of the housing when the driving member is at the wire detachment position.

10. The cable-type driving force transmission mechanism according to claim 7, wherein the shaft portion of the cable end pin, which is connected to the driving member, extends to an outside of the housing when the driving member is at the wire detachment position.

* * * * *